US009627770B2

(12) United States Patent
Svendsen et al.

(10) Patent No.: US 9,627,770 B2
(45) Date of Patent: Apr. 18, 2017

(54) ANTENNA MODULE AND A METHOD FOR WIRELESS COMMUNICATION

(71) Applicant: Intel IP Corporation, Santa Clara, CA (US)

(72) Inventors: Simon Svendsen, Aalborg (DK); Ole Jagielski, Frederikshavn (DK); Finn Hausager, Aabybro (DK)

(73) Assignee: Intel IP Corporation, Santa Clara, CA (US)

( * ) Notice: Subject to any disclaimer, the term of this patent is extended or adjusted under 35 U.S.C. 154(b) by 89 days.

(21) Appl. No.: 14/478,388

(22) Filed: Sep. 5, 2014

(65) Prior Publication Data

US 2015/0092623 A1 Apr. 2, 2015

(30) Foreign Application Priority Data

Sep. 30, 2013 (DE) ........................ 10 2013 110 795

(51) Int. Cl.
*H01Q 9/04* (2006.01)
*H01Q 21/28* (2006.01)
(Continued)

(52) U.S. Cl.
CPC ............. *H01Q 13/106* (2013.01); *H01Q 5/35* (2015.01); *H01Q 9/04* (2013.01); *H01Q 13/103* (2013.01); *H01Q 21/28* (2013.01); *H04L 5/1423* (2013.01)

(58) Field of Classification Search
CPC ........ H01Q 1/2291; H01Q 1/243; H01Q 1/36; H01Q 1/38; H01Q 5/01; H01Q 5/30;
(Continued)

(56) References Cited

U.S. PATENT DOCUMENTS 6,078,299 A * 6/2000 Scharfe, Jr. .............. H01Q 9/16 333/117
6,215,451 B1 * 4/2001 Hadzoglou .......... H01Q 1/1285 343/702
(Continued)

FOREIGN PATENT DOCUMENTS

EP 1511117 A1 3/2005
WO WO-2012159110 A2 11/2012

OTHER PUBLICATIONS

Boyle, K. R, et al., "A Novel Dual-fed, Self-Diplexing PIFA and RF Front-end (PIN-DF2-PIFA)", IEEE, (2004), 1935-1938.
(Continued)

*Primary Examiner* — Michael Thier
*Assistant Examiner* — Eric Nowlin
(74) *Attorney, Agent, or Firm* — Schwegman Lundberg & Woessner, P.A.

(57) ABSTRACT

An antenna module for wireless communication comprises an antenna element, a first port and a second port. The antenna element comprises a first resonance frequency and a second resonance frequency. The first port is configured to receive or provide a first radio frequency signal with a first frequency range and the second port is configured to receive or provide a second radio frequency signal with a second frequency range. The first frequency range is different from the second frequency range. Further, the first resonance frequency is located in the first frequency range and the second resonance frequency is located in the second frequency range. The antenna element is configured to transmit or receive the first radio frequency signal and the second radio frequency signal simultaneously.

20 Claims, 21 Drawing Sheets

(51) Int. Cl.

| | |
|---|---|
| ***H01Q 5/35*** | (2015.01) |
| ***H01Q 13/10*** | (2006.01) |
| ***H04L 5/14*** | (2006.01) |

(58) Field of Classification Search

CPC .......... H01Q 5/314; H01Q 5/321; H01Q 5/35; H01Q 5/357; H01Q 5/378; H01Q 5/385; H01Q 5/392; H01Q 7/00; H01Q 7/005; H01Q 9/04; H01Q 9/0407; H01Q 9/0421; H01Q 9/0457; H01Q 9/065; H01Q 9/145; H01Q 9/16; H01Q 9/26; H01Q 9/285; H01Q 9/30; H01Q 9/42; H01Q 13/10; H01Q 13/103; H01Q 13/106; H01Q 13/16; H01Q 21/28; H01Q 21/30; H04M 1/026; H04L 5/1423

See application file for complete search history.

(56) References Cited

U.S. PATENT DOCUMENTS

| | | | | |
|---|---|---|---|---|
| 6,549,242 | B1 * | 4/2003 | Plonka ................... | H01Q 21/26 348/21 |
| 6,677,909 | B2 * | 1/2004 | Sun .......................... | H01Q 1/38 343/767 |
| 7,091,915 | B1 * | 8/2006 | Truthan ............... | H01Q 1/1285 343/713 |
| 7,265,731 | B2 * | 9/2007 | Vance .................. | H01Q 9/0421 333/32 |
| 7,469,131 | B2 | 12/2008 | Nail et al. | |
| 7,671,808 | B2 | 3/2010 | Boyle | |
| 8,009,103 | B2 * | 8/2011 | Chang .................... | H01Q 1/243 343/700 MS |
| 8,055,209 | B1 * | 11/2011 | Dao ....................... | H01Q 19/13 455/552.1 |
| 8,081,135 | B2 * | 12/2011 | Pintos .................. | H01Q 9/0407 343/700 MS |
| 8,179,324 | B2 | 5/2012 | Rao et al. | |
| 8,260,347 | B2 | 9/2012 | Tang et al. | |
| 8,390,519 | B2 | 3/2013 | Wang et al. | |
| 8,952,852 | B2 * | 2/2015 | Badaruzzaman ...... | H01Q 1/243 343/702 |
| 9,190,699 | B2 * | 11/2015 | Granger-Jones .......... | H01P 1/15 |
| 2002/0077154 | A1 * | 6/2002 | Judson ................... | H01Q 1/246 455/562.1 |
| 2006/0014503 | A1 * | 1/2006 | Theobold ........... | G01R 29/0878 455/126 |
| 2009/0318094 | A1 * | 12/2009 | Pros ....................... | H01Q 1/245 455/75 |
| 2010/0271264 | A1 * | 10/2010 | Li .......................... | H01Q 1/243 343/700 MS |
| 2011/0031668 | A1 | 2/2011 | Schlittler et al. | |
| 2011/0133995 | A1 * | 6/2011 | Pascolini ................. | H01Q 7/00 343/702 |
| 2012/0007784 | A1 * | 1/2012 | Ling ...................... | H01Q 1/243 343/720 |
| 2012/0051311 | A1 | 3/2012 | Kim et al. | |
| 2012/0157013 | A1 * | 6/2012 | Wu ...................... | H04B 1/0057 455/84 |
| 2012/0302282 | A1 * | 11/2012 | Pascolini ................ | H03H 7/38 455/550.1 |
| 2013/0229320 | A1 * | 9/2013 | Asanuma ................ | H01Q 7/00 343/788 |
| 2013/0241781 | A1 | 9/2013 | Breiter | |
| 2013/0257679 | A1 * | 10/2013 | Wong ....................... | H01Q 9/42 343/876 |
| 2014/0139389 | A1 * | 5/2014 | Odorcic ................... | H01Q 9/28 343/834 |
| 2014/0227982 | A1 * | 8/2014 | Granger-Jones ..... | H04B 7/0404 455/77 |
| 2014/0327587 | A1 * | 11/2014 | Won ....................... | H01Q 5/335 343/720 |
| 2015/0092623 | A1 * | 4/2015 | Svendsen ............. | H01Q 13/103 370/278 |
| 2015/0380818 | A1 * | 12/2015 | Svendsen ............... | H01Q 5/307 343/700 MS |

OTHER PUBLICATIONS

Boyle, Kevin R, et al., “A Dual-Fed, Self-Diplexing PIFA and RF Front-End”, IEEE Transactions on Antennas and Propagation, 55(2), (Feb. 2007), 373-382.

Boyle, K. R, et al., “Radiating and balanced mode analysis of PIFA antennas”, IEEE Transactions on Antennas and Propagation, 54(1), (Jan. 2006), 231-237.

Melde, K. L, et al., “Software Defined Match Control Circuit Integrated With a Planar Inverted F Antenna”, IEEE Transactions on Antennas and Propagation, 58(12), (Dec. 2010), 3884-3890.

Montero-De-Paz, J., et al., “Multifrequency Self-Diplexed Single Patch Antennas Loaded with Split Ring Resonators”, Progress in Electromagnetics Research, 113, (2011), 47-66.

Rikuta, Y., et al., “A self-diplexing antenna using stacked patch antennas”, IEEE Antennas and Propagation Society International Symposium, vol. 4, (Jul. 16, 2000), 2212-2215.

Rikuta, Yuko, et al., “A self-diplexing antenna using slitted patch antenna”, Interim International Symposium on Antennas and Propagation, [online]. Retrieved from the Internet: <URL: http://ap-s.ei.tuat.ac.jp/isapx/2002/pdf/00134.pdf>, (2002), 121-124.

* cited by examiner

ANTENNA MODULE AND A METHOD FOR WIRELESS COMMUNICATION

This application claims the benefit of priority to German Application No. 102013110795.8, filed Sep. 30, 2013, which is incorporated herein by reference in its entirety.

TECHNICAL FIELD

The present disclosure relates to the wireless transmission or reception of signals and in particular to an antenna module for wireless communication and a method for wireless communication.

BACKGROUND

The number of antennas needed in modern wireless devices (e.g. smartphones) are increasing in order to support new cellular bands between 600 MHz to 3800 MHz MIMO (Multiple-Input Multiple-Output), carrier aggregation, WLAN (wireless local area network), NFC (Near Field Communication) and GPS (Global Positioning System), for example, which is a challenge due to the volume required for each antenna to achieve good performance. For example, the performance of antennas in mobile phones is (among others) related to the volume allocated and the physical placement in the phone. Increasing the allocated volume for the antenna can result in better antenna performance in terms of S11 (reflection coefficient) and radiated efficiency. A better performance of the antennas may also be obtained when they are placed at the circumference of the phone. The width of the display and batteries is often nearly as wide as the smartphone itself and the available volume for antennas at the circumference near these components is very limited and in many cases not usable for antennas. Other components like the USB connector, the audio jack and different user control buttons, are normally also placed at the circumference, reducing the volume for the antenna even more. Therefore, it is desired to provide antenna modules with low space consumption and good performance for wireless communication devices.

BRIEF DESCRIPTION OF THE FIGURES

Some examples of apparatuses and/or methods will be described in the following by way of example only, and with reference to the accompanying figures, in which.

DETAILED DESCRIPTION

Various examples will now be described more fully with reference to the accompanying drawings in which some examples are illustrated. In the figures, the thicknesses of lines, layers and/or regions may be exaggerated for clarity.

Accordingly, while examples are capable of various modifications and alternative forms, the illustrative examples in the figures and will herein be described in detail. It should be understood, however, that there is no intent to limit examples to the particular forms disclosed, but on the contrary, examples are to cover all modifications, equivalents, and alternatives falling within the scope of the disclosure. Like numbers refer to like or similar elements throughout the description of the figures.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing illustrative examples only and is not intended to be limiting. As used herein, the singular forms "a," "an" and "the" are intended to include the plural forms as well, unless the context clearly indicates otherwise. It will be further understood that the terms "comprises," "comprising,"

“includes” and/or “including,” when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which examples belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Figure 1:
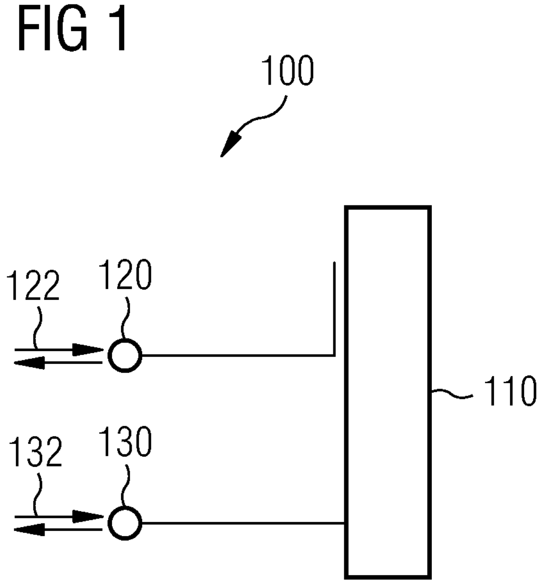
FIG. 1 shows a schematic illustration of an antenna module.

FIG. 1 shows a schematic illustration of an antenna module 100 for wireless communication according to an example. The antenna module 100 comprises an antenna element 110, a first port 120 and a second port 130. The antenna element 110 comprises a first resonance frequency and a second resonance frequency. The first port 120 is configured to receive or provide a first radio frequency signal 122 with a first frequency range and the second port 130 is configured to receive or provide a second radio frequency signal 132 with a second frequency range. The first frequency range is different from the second frequency range. Further, the first resonance frequency is located in the first frequency range and the second resonance frequency is located in the second frequency range. The antenna element 110 is configured to transmit or receive the first radio frequency signal 122 and the second radio frequency signal 132 simultaneously.

By feeding an antenna element having two different resonance frequencies with two signals through two independent ports, the two signals can be sent simultaneously, for example. Simultaneously, it may also be possible to receive two different signals with two different frequency ranges and provide these signals at the two independent ports. Due to the two resonance frequencies of the antenna element corresponding to the frequency ranges of the signals to be transmitted or received, the signals may be received or transmitted with good quality while the space consumption may be kept low for the implementation of the antenna module 100, for example. Further, the costs for the antenna module may be low.

The antenna module 100 may be a module connected to at least two signal paths (transmit and/or receive path) of one more receivers, transmitters or transceivers through the at least first port 120 and second port 130. Further, the antenna module 100 enables a wireless communication with one or more other wireless communication devices by transmitting or radiating signals to be sent and/or receiving wireless signals sent to the antenna module 100, for example.

The antenna element 110 can be implemented or designed in various ways in order to comprise at least two resonance frequencies in the frequency range of the signals to be transmitted or received. A resonance frequency of the antenna element 110 may be a frequency at which a response amplitude of a radiated signal comprises a relative or local maximum, for example. For example, the resonance frequencies of the antenna element 110 may be defined or set by the geometry of the antenna element 110, the used material and/or properties of electrical elements coupled or connected to the antenna element 110 (e.g. direct or indirect feed from the ports, matching elements and/or connection to reference potential).

The first port 120 and the second port 130 may be electrical connection interfaces for connecting the antenna module 100 to one or more receiver modules, transmitter modules and/or transceiver modules. For example, a first transceiver module (e.g. cellular) provides signals to be transmitted to the first port 120 and/or receives signals received through the antenna element 110 from the first port 120 and a second transceiver module (e.g. WLAN or GPS) provides signals to be transmitted to the second port 130 and/or receives signals received through the antenna element 110 from the second port 130. In other words, the antenna module 100 comprises a first signal path from the first port 120 to the antenna element 110 and a second signal path from the second port 130 to the antenna element 110.

The first radio frequency signal 122 and the second radio frequency signal 132 are located in the radio frequency domain (e.g. 500 MHz to 10 GHz) and can be transmitted or received through the antenna element 110 at the same time.

The first radio frequency signal 122 and the second radio frequency signal 132 comprise different frequency ranges. The first radio frequency signal 122 and the second radio frequency signal 132 may comprise different frequency ranges, if at least a part of the first frequency range is not included by the second frequency range. In other words, the first frequency range and the second frequency range may overlap. Alternatively, the first frequency range and the second frequency range may be completely different. In other words, a highest frequency of the first frequency range is lower than a lowest frequency of the second frequency range or a highest frequency of the second frequency range is lower than a lowest frequency of the second frequency range. The frequency range of a signal may be a frequency band containing more than 70% (or more than 80% more than 90% or more than 95%) of the signal power of the signal or a frequency band predefined for transmitting or receiving a signal, for example. For example, the first frequency range of the first radio frequency signal 122 may comprise frequencies lower than 1 GHz (e.g. cellular low band frequencies) and the second frequency range of the second radio frequency signal (132) may comprise frequencies higher than 1 GHz (e.g. WLAN or GPS). Further, the resonance frequencies may be adapted to these frequencies. In other words, the antenna element may be configured so that the first resonance frequency is lower than 1 GHz and the second resonance frequency is higher than 1 GHz. For example, the first frequency range may comprise frequencies between 600 MHz and 1000 MHz and the second frequency range comprises frequencies between 2.2 GHz and 3 GHz. Consequently, the first resonance frequency may be between 600 MHz and 1000 MHz and the second resonance frequency may be between 2.2 GHz and 3 GHz.

The first port 120 and the second port 130 may be coupled or connected to the antenna element 110 in various ways in order to transmit a signal through the antenna element 110 or receive a signal through the antenna element 110. For example, a port may be electrically connected to the antenna element 110 as it is shown for the second port 130 in FIG. 1. Alternatively, a port can be coupled to the antenna element 110 capacitively and/or inductively as it is shown for the first port 120 in FIG. 1 implementing an indirect feed of the antenna element 110. A capacitively coupled coupler element may be insulated from a reference potential (e.g. ground) and an inductively coupled coupler element may be connected to a reference potential, for example. Further, a port may be connected to the antenna element 110 through a capacitor element (e.g. matching capacitance) to the antenna element 110 (e.g. shown in FIG. 4 for the WLAN port) implementing a direct feed of the antenna element 110.

In other words, the antenna module 100 may further comprise a coupler element connected to the first port 120 and arranged in the proximity of the antenna element 110 so that the coupler element is capacitively or inductively coupled to the antenna element 110 in order to transmit or receive the first radio frequency signal 122 through the antenna element 110 (indirect feed). The coupler element may be implemented by an electrical conductive element arranged at least partly in parallel to the antenna element 110 or with a predefined distance and/or orientation to the antenna element 110, for example. By capacitively and/or inductively coupling a port to the antenna element 110 for receiving or transmitting signals through the antenna element 100, the bandwidth of the signals, which can be transmitted with high quality by the antenna element 110, may be increased, for example.

Further, the second port 130 may be connected to the antenna element 110 (direct feed).

Figure 2:
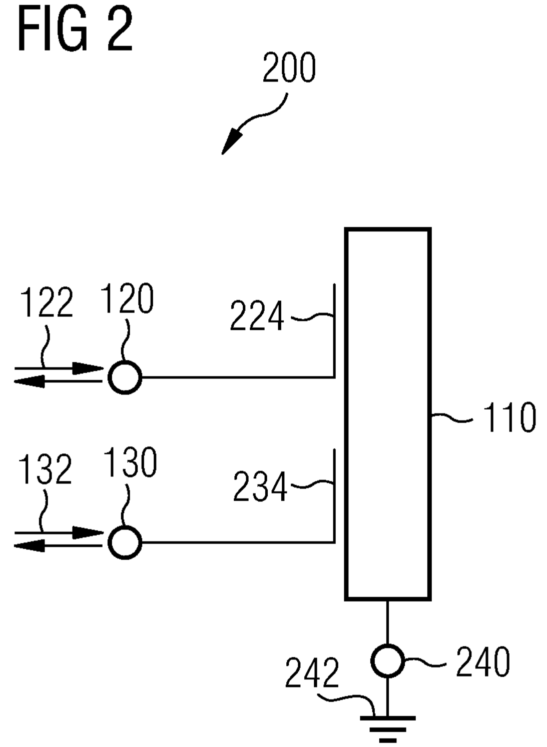
FIG. 2 shows a schematic illustration of a further antenna module.

Alternatively, both ports may be connected (e.g. directly or through one or more matching elements) to the antenna element 110 implementing two direct feeds or both ports may be capacitively or inductively coupled to the antenna element 110 implementing two indirect feeds. FIG. 2 shows a schematic illustration of an antenna module with two ports capacitively or inductively coupled to the antenna element 110 according to an example. The implementation of the antenna module 200 is similar to the implementation shown in FIG. 1. Additionally, the antenna module 200 comprises a third port connected to the antenna element 110. The third port 240 is configured to be electrically connected to a reference potential (e.g. ground or another reference potential provided by the device using the antenna module). The third port 240 may be connected directly to the antenna element 110 or through an electrical element (e.g. capacitor element or inductor element) influencing the resonance frequencies of the antenna element 110. For example, an inductor element may be arranged between the antenna element 110 and the third port 240. The inductor element may change, influence or adapt the first resonance frequency so that the first resonance frequency is located in the first frequency range (e.g. in addition to other parameters influencing the resonance frequency) and/or influence or adapt the second resonance frequency so that the sec- and resonance frequency is located in the second frequency range, for example.

In comparison to FIG. 1, also the second port 130 is capacitively or inductively coupled to the antenna element 110. In other words, the antenna module 200 comprises a first coupler module 224 connected to the first port 120 (as also shown in FIG. 1) and a second coupler element 234 connected to the second port 130. Further, the second coupler element 234 is arranged in the proximity of the antenna element 110 so that the second coupler element 234 is capacitively or inductively coupled to the antenna element 110 in order to transmit or receive the second radio frequency signal 132 through the antenna element 110.

As already mentioned, the antenna element 110 may be implemented in various ways. For example, the antenna element may be a single antenna element implemented by a one-pieced electrical conductive element. Additionally, the single antenna element may comprise one or more matching elements for influencing the resonance frequencies of the antenna element. Alternatively, the antenna element 110 may comprise one or more sub-elements electrically connected to each other (e.g. antenna fingers).

Further, the antenna element 110 may comprise a laminar shape, for example. In other words, the antenna element 110 may comprise a thickness in one direction significantly smaller than dimensions in directions orthogonal to the direction of the thickness. The antenna element 110 may be planar or may comprise a curvature or a three-dimensional shape (e.g. adapted to the available space at the device using the antenna module).

For example, a dimension of the antenna element in a first direction along the laminar shape may be more than five times (or more than ten times or more than twenty times) a dimension of the antenna element 110 in a second direction along the laminar shape orthogonal to the first direction (e.g. basically longish or rectangular-shaped).

The antenna element 110 may comprise a slot or opening within the laminar shape (e.g. hole through the antenna element).

In other words, the antenna element 110 may comprise an electrical conductive element at least partly enclosing a slot or opening. For example, the electrically conductive element surrounds the slot completely or leaves a gap (e.g. resulting in a C-shape or an O-shape with interruption). By implementing a slot within the antenna element, the antenna element may then be used in a monopole mode for exciting the first resonance frequency and in a loop mode (around the slot) in order to excite the second resonance frequency of the antenna element 110, for example.

Optionally, the electrical conductive element of the antenna element encloses the slot only partly and the remaining gap is electrically closed by an inductor element. For example, an antenna module for wireless communication comprises an antenna element 110 comprising an electrical conductive element partly enclosing a slot and an inductor element electrically connected to the electrical conductive element so that the electrical conductive element and the inductor element implement a loop enclosing the slot. In other words, the antenna element 110 may comprise the electrically conductive element enclosing partly the slot and an inductor element electrically connecting ends of the electrical conductive element (located at opposite sides of the gap) so that the slot is enclosed by the electrically conductive element and the inductor element. The first resonance frequency and the second resonance frequency of the antenna element 110 may vary depending on the size of the inductance of the inductor element, for example. In this way, the first resonance frequency and/or the second resonance frequency may be influenced or adapted by the inductor element in order to adjust the resonance frequencies to the frequency ranges of the signals to be sent or received, for example.

For example, a dimension of the slot in the first direction may be more than five times (or more than ten times or more than twenty times) a dimension of the slot in the second direction.

Figure 3A:
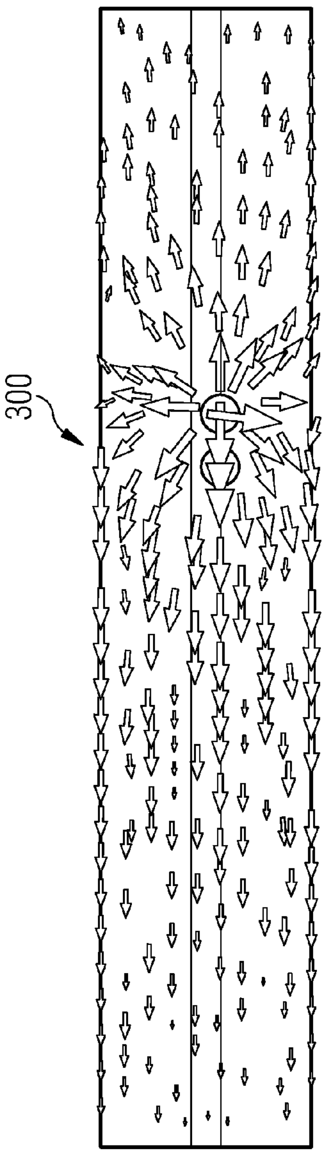
FIGS. 3A to 3C show schematic illustrations of currents within different antenna elements.
Figure 3B:
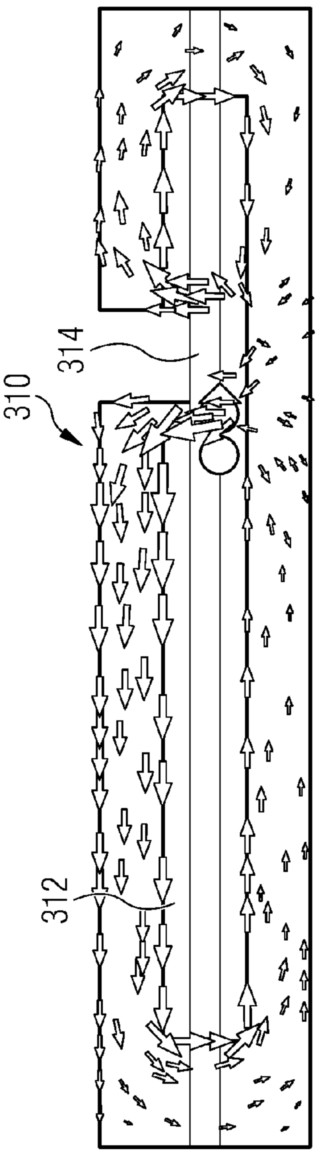
Figure 3C:
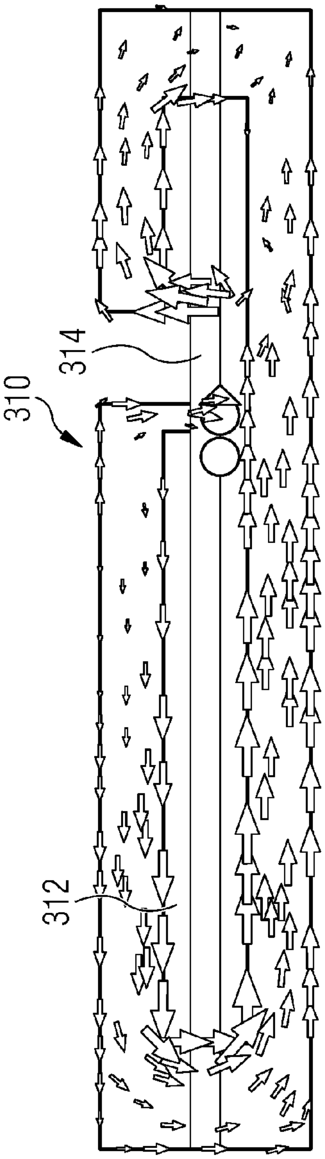

FIGS. 3A to 3C show schematically different radiating modes of antenna elements. The current direction and current strength is indicated by size and direction of the arrows. FIG. 3A shows the monopole mode of an (antenna) element 300 without a slot (at e.g. 850 MHz). The currents are 180° out of phase seen from or occurring at the ground point 2 of the element 300, for example. FIG. 3B shows the monopole mode of an (antenna) element 310 including a slot 312 and a loop inductor 314. The 180° phase shift may still be present (e.g. monopole mode at 850 MHz for a multi-coupled element). For example, the currents are forced around the slot and the current density is higher at the side of the loop where the element is connected to ground. This may cause a small imbalance compared to the non-slot version and may increase the QF (Quality Factor) of the element 310 and may reduce the available bandwidth by a small factor. FIG. 3C shows the loop mode at 2.4 GHz (or loop-like mode at 2.5 GHz for a multi-coupled element), where the current around the ground point is in phase, for example. Further, the connection to the first port 3 and the connection to the second port 1 (and a printed circuit board PCB behind the antenna element, for example) are indicated.

Figure 4:
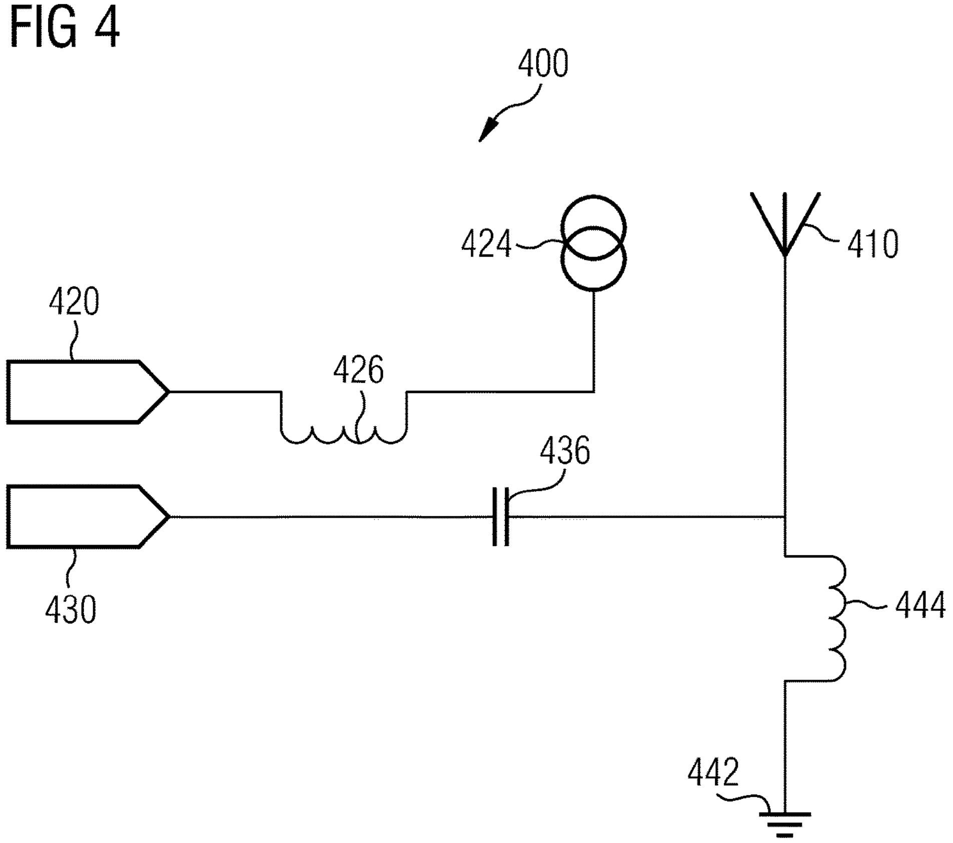
FIG. 4 shows a block diagram of an antenna module.

FIG. 4 shows a block diagram of an antenna module 400 according to an example. The implementation of the antenna module 400 is similar to the antenna module shown in FIGS. 1 and 2. The first port 420 (e.g. configured to receive a signal with cellular low band frequencies) is electrically connected to a coupler element 424 through a matching element represented by an inductor element 426 (e.g. cellular match inductor of for example 36 nH). The coupler element 424 is arranged in the proximity of the antenna element 410 in order to transmit or receive a first signal through the antenna element 410 by capacitive coupling. The second port 430 (e.g. for receiving or providing a signal with WLAN frequencies) is connected through a matching element represented by a matching capacitor 436 (e.g. WLAN match capacitor of 0.35 pF for example) to the antenna element 410. The antenna element 410 is further electrically connected to a reference potential (e.g. ground) through a matching element represented by an inductor element 444 (e.g. cellular resonator inductor and/or WLAN match inductor of 16 nH for example). The given examples for values for capacitor or inductor elements may also be selected differently by ±20% (or 10% or ±5%) of the given values or may be selected differently in order to address other frequency ranges, for example.

For example, the coupler element 424 is connected to the first port 420 through a matching element configured to adapt an impedance of the first signal path from the first port 420 to the coupler element 424 to the first resonance frequency of the antenna element 410 so that a reflection coefficient S11 of less than −6 dB may be obtained for the first radio frequency signal.

Further, the second port 430 is connected to the antenna element 410 through a matching capacitor (e.g. discrete element) damping low frequencies (e.g. frequency of the cellular low band) and comprising neglectable influence to at least high frequency signals with the second frequency range (e.g. WLAN frequencies). In comparison to the indirect coupling of the coupler element 424, the matching capacitor 436 may be a discrete capacitor element within the second signal path. For example, a matching capacitor 436 is configured to damp frequencies of the first radio frequency signal so that signal portions caused by the first radio frequency signal provided at the second port are less than −10 dB (S21<−10 dB). In this way, a good isolation may be obtained between the two signal paths.

Further, the inductor element 426 may be configured to damp frequencies of the second radio frequency signal so that signal portions caused by the second radio frequency signal provided at the first port are less than −10 dB (S12<−10 dB). In this way, a good isolation may be obtained between the two signal paths, for example.

Additionally, the inductor element 444 arranged between the antenna element 410 and a third port connected to the reference potential 442 may be configured to influence the first resonance frequency of the antenna element 410 so that the first resonance frequency is located in the first frequency range of the first radio frequency signal (e.g. in combination with the influence of the matching inductor within the first transmit path), for example.

By the matching inductor elements and capacitor elements the impedance of the different transmit or receive paths may be tuned to the desired frequency band of the signal to be transmitted or received through the respective signal path without significantly influencing the properties of the other signal path, for example.

Alternatively to the direct feed of the signal through the second port 430, also an indirect feed similar to the first signal path can be implemented for the second signal path, for example.

For example, the coupler element 424 may be electrically insulated from the third port, which is electrically connected to the antenna element 410. Consequently, the coupler element 424 may be electrically insulated from the reference potential 442, if the third port is connected to the reference potential 442.

Optionally, additionally or alternatively to one or more aspects mentioned above, a third radio frequency signal with a third frequency range (e.g. higher than the first frequency range and the second frequency range) may be provided to the first port 420 (e.g. the WLAN high band signal) or the second port 430 to be transmitted through the antenna element 410, for example.

The antenna element 410 may be a dual feeding dual resonant antenna element, for example.

As an example, the first port 420 may be connected to a cellular transceiver (e.g. GSM or LTE) and the second port 430 may be connected to a WLAN transceiver.

The element and coupler may be matched as shown in FIG. 4 when combining cellular and WLAN on the same antenna element. A 12 nH loop inductor (inductor element of the antenna element) is not shown is FIG. 4, since this is not directly part of the match, in this example. FIG. 4 shows an example for a match of indirect feed including WLAN.

Figure 5A:
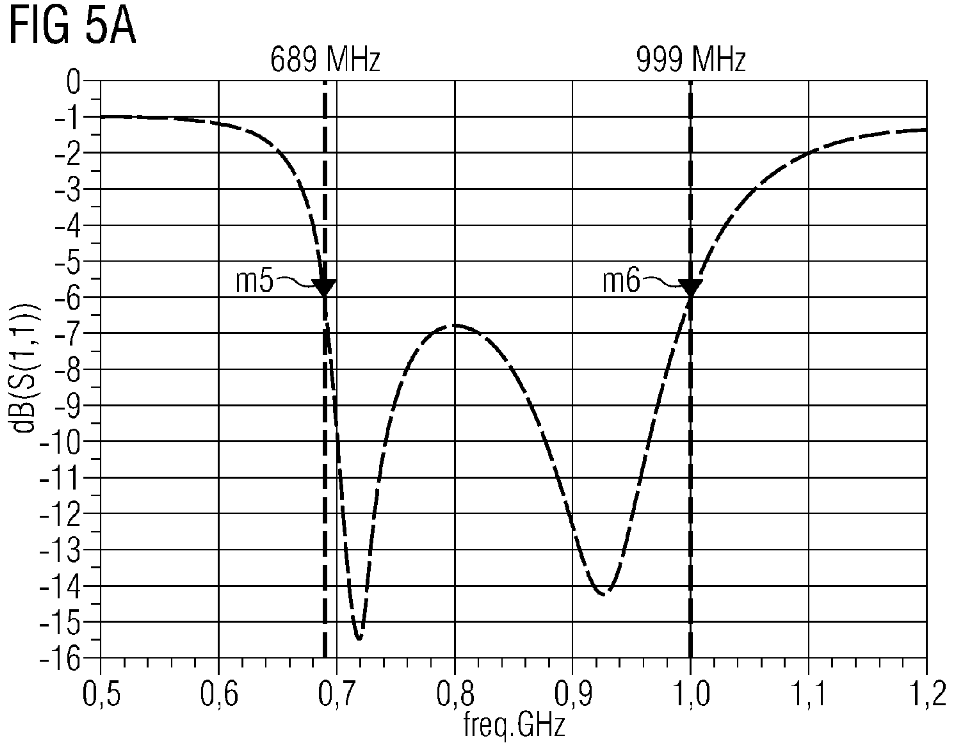
FIG. 5A shows the reflection coefficient S11 for cellular low band frequencies of the antenna module shown in FIG. 4.

The WLAN signal is coupled through a small value capacitor between the element and the inductor to ground, which now acts as a matching inductor for WLAN. The small series capacitance value used to match the WLAN and the large inductor value used to match cellular band may ensure a good isolation between the two Systems (e.g. FIG. 8). The cellular low band S11 and complex impedance of the indirect feeding technique including the added direct feed 2.4 GHz WLAN is shown in FIG. 5A, where it is seen that the bandwidth at S11 at −6 dB is 310 MHz, which corresponds to a relative bandwidth of approximately 36%. For example, a small reduction of the cellular bandwidth (5% relative bandwidth) is observed, which is caused by the slot in the element, since it disturb the monopole mode as shown in FIG. 3B.

FIG. 5A shows a cellular S11 and complex impedance of the indirect feeding technique including a direct coupling of the WLAN signal to the element. FIG. 5A indicates the reflection coefficient S11 in dB over frequencies of 0.5 GHz to 1.2 GHz.

Figure 6A:
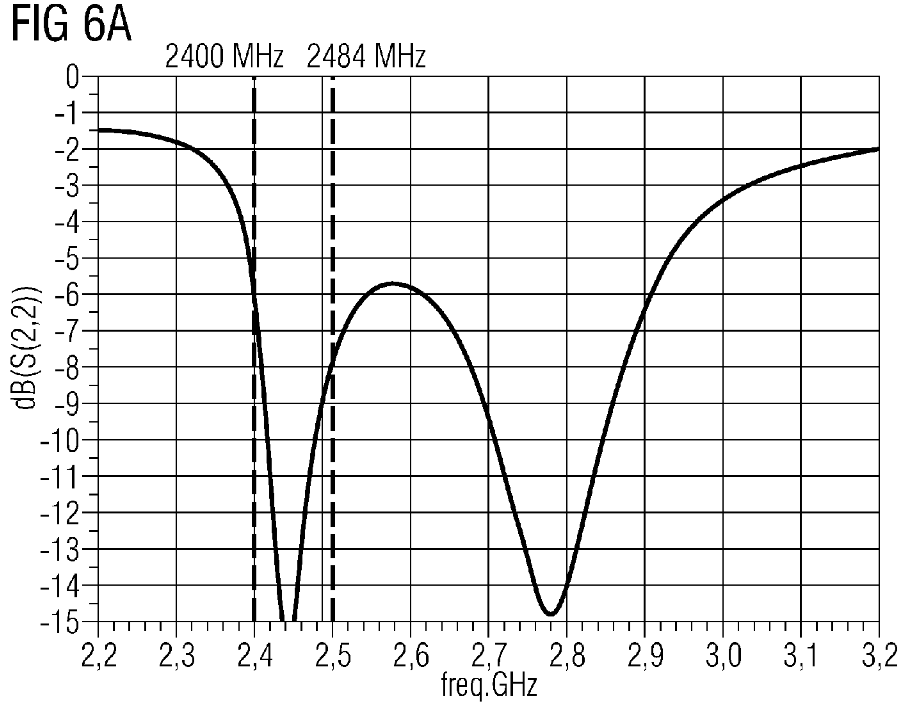
FIG. 6A shows the reflection coefficient S11 for WLAN low band frequencies for the antenna module shown in FIG. 4.

The WLAN 2.4 GHz S11 and the complex impedance of the WLAN direct feeding is shown in FIG. 6A. FIG. 6A shows the 2.4 GHz WLAN S11 and the complex impedance of the direct feeding of WLAN. In other words, FIG. 6A indicates the reflection coefficient S11 in dB over frequencies of 2.2 GHz to 3.2 GHz.

The obtained bandwidth may be more than sufficient for covering 2.4 GHz WLAN, which may be due to the relative low Q of the element used to cover the cellular bandwidth requirements. Many WLAN Systems also use the 5.6 GHz ISM band (industrial, scientific and medical) for improved throughput, which may mean that a 2.4 GHz WLAN alone might not save an additional antenna element, if WLAN 5.6

GHz is not supported, for example. The 5.6 GHz WLAN can also be included in this concept by adjusting the electrical length of the coupler to act as a half wave parasitic dipole at 5.6 GHz, for example. This may be possible due to the high value inductor used to match the cellular low band signal to 50Ω. The S11 and complex impedance for WLAN at 5.6 GHz is shown in FIG. 7A.

Figure 7A:
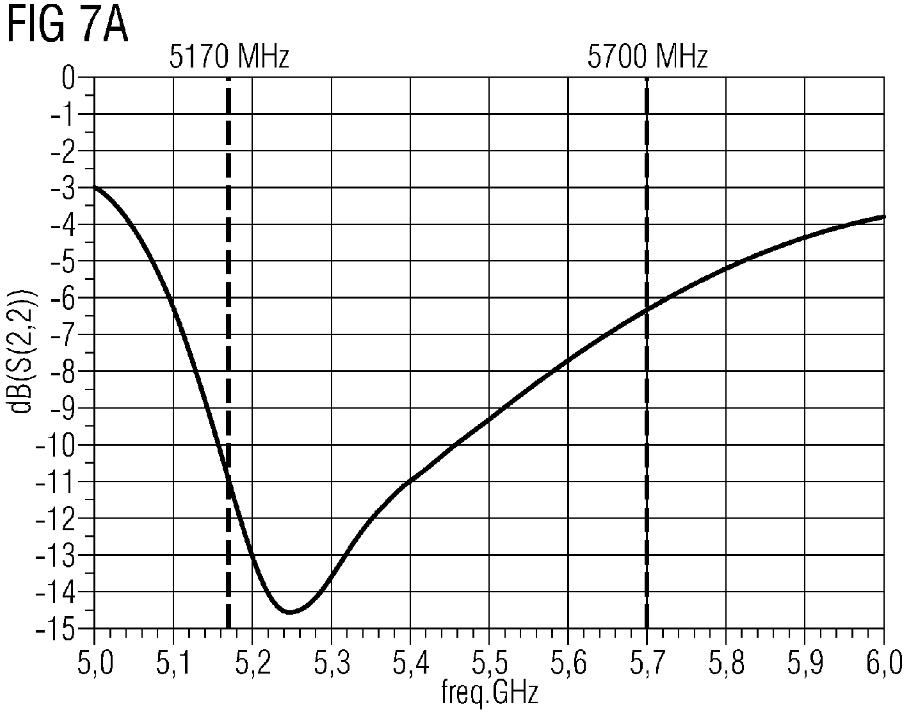
FIG. 7A shows the reflection coefficient S11 for WLAN high band frequencies for the antenna module shown in FIG. 4.

FIG. 7A shows the 5.6 GHz WLAN S11 and complex impedance of the direct feeding of WLAN. FIG. 7A indicates the reflection coefficient S11 in dB over frequencies of 5.0 GHz to 6.0 GHz.

Figure 8:
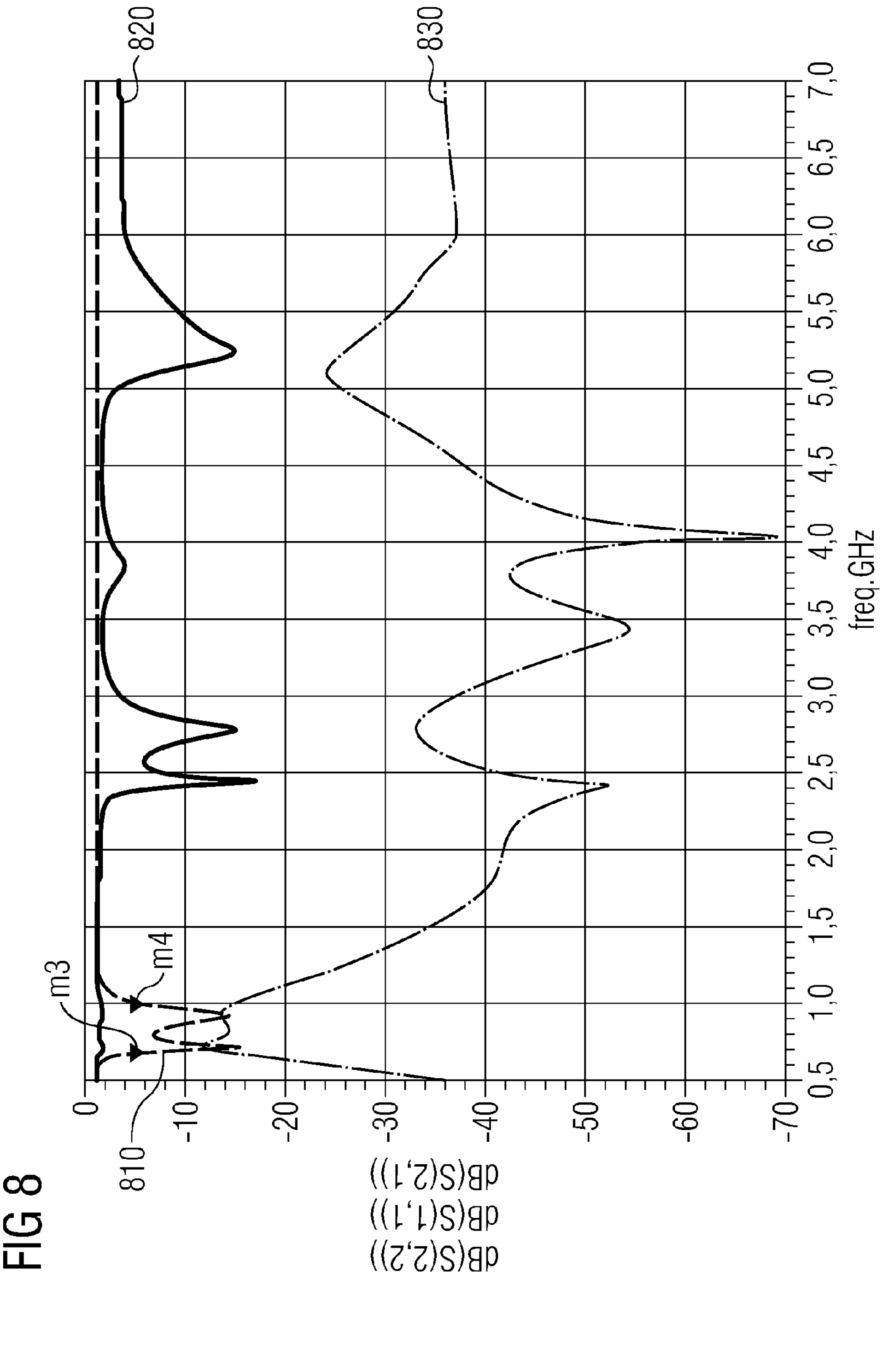
FIG. 8 shows the reflection coefficient S21 between the cellular low band and the WLAN frequencies for the antenna module shown in FIG. 4.

The isolation between cellular and WLAN (first and second signal path) is shown in FIG. 8. FIG. 8 indicates the reflection coefficient S11 810 of the first signal path in dB over frequencies of 0.5 GHz to 7.0 GHz and the reflection coefficient S22 820 of the second signal path in dB over frequencies of 0.5 GHz to 7.0 GHz. Further, FIG. 8 indicates the reflection coefficient S21 830 representing the isolation of the second signal path against signals from the first signal path in dB over frequencies of 0.5 GHz to 7.0 GHz.

Good isolation may be obtained for all the supported wireless communication systems, for example.

Figure 9:
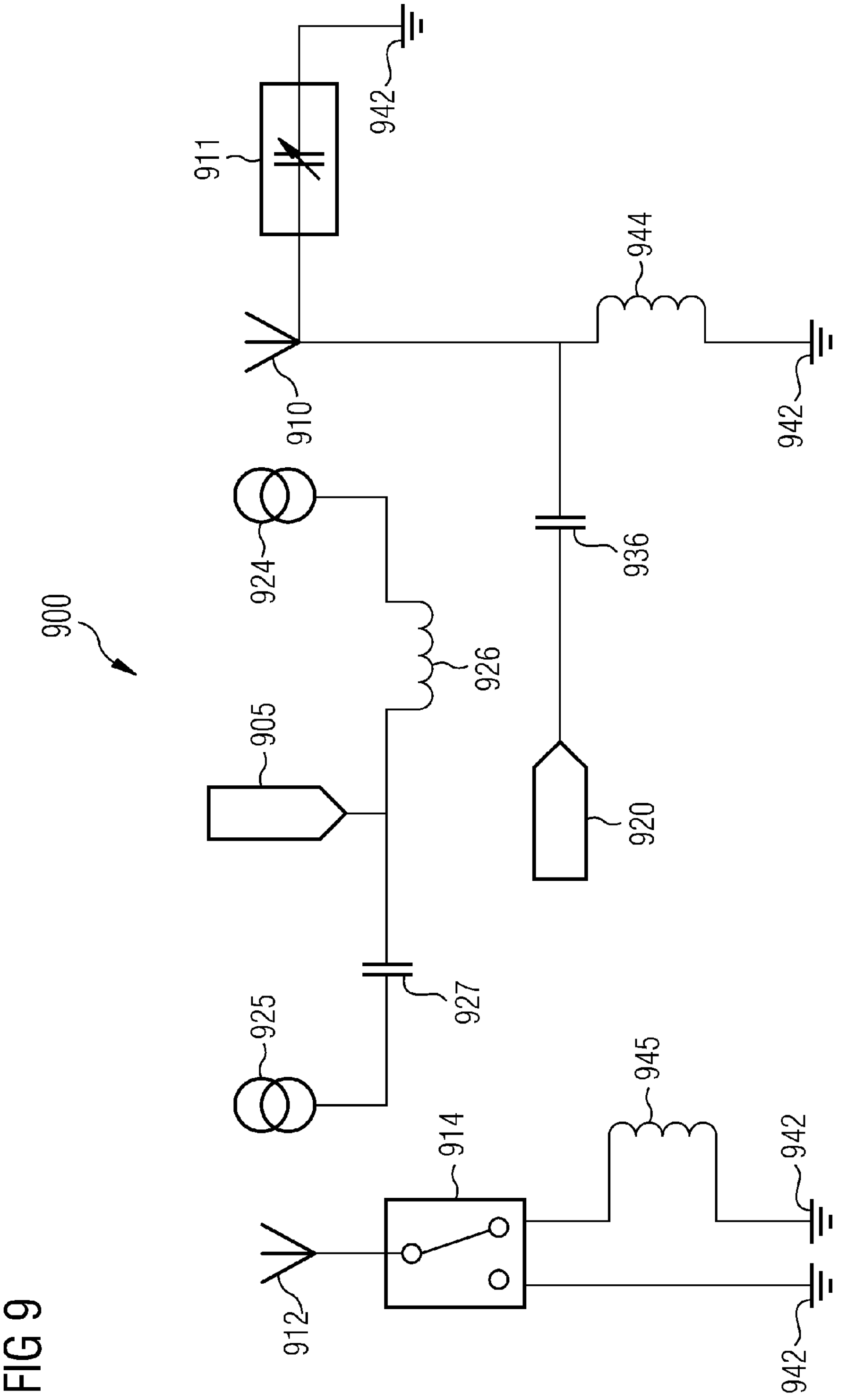
FIG. 9 shows a block diagram of an antenna module.

FIG. 9 shows a block diagram of an antenna module 900 according to an example. The implementation of the antenna module 900 is similar to the implementation shown in FIG. 4. However, the antenna module 900 comprises a second antenna element 912 (e.g. for the cellular high band). The first port 905 is connected to a first coupler element 924 (e.g. for the cellular low band) through a matching element represented by a matching inductor element 926 (e.g. cellular low band inductor of 43 nH for example) and connected to a second coupler element 925 (e.g. for the cellular high band) through a matching element represented by a matching capacitor element 927 (e.g. cellular high band match capacitor of 0.65 pf for example). The first coupler element 924 is capacitively or inductively coupled to the first antenna element 910 and the second coupler element 925 is capacitively or inductively coupled to the second antenna element 912. For example, the first coupler element 924 may be capacitively coupled to the first antenna element 910 and the second coupler element 925 may be inductively coupled to the second antenna element 912 or vice versa. The second port (e.g. for a WLAN frequency band) is connected to the first antenna element 910 through a matching element represented by a matching capacitor element (e.g. WLAN match capacitor of 0.70 pf for example). The first antenna element 910 is connected to a reference potential 942 (e.g. ground) through an inductor element (e.g. cellular resonator inductor of 3.9 nH). Additionally, the first antenna element 910 is connected to the reference potential 942 through a tuning element represented by a variable capacitor element 911 (e.g. cellular tuning capacitor of 0.6 pF to 2.35 pF for example). In other words, the antenna module 900 may comprise a port electrically connected to the first antenna element 910 through a variable tuning capacitor 911 and the port may be electrically connected to the reference potential 942. The second antenna element 912 is connected to a switching element 914 (e.g. high band HB cellular tuning switch SW). The switching element 914 can connect the second antenna element 912 directly (e.g. through a fourth port of the antenna module) to the reference potential 942 or through an inductor element 945 (e.g. cellular high band resonator inductor of 2.4 nH for example) to the reference potential 942. The given examples for values for capacitor or inductor elements may also be selected differently by ±20% (or ±10% or ±5%) of the given values or may be selected differently in order to address other frequency ranges, for example. The first coupler element 924 and the second coupler element 925 are connected to a common port 905 as shown in FIG. 9 (single feed) or may be connected to two independent ports (dual feed), for example.

In the example shown in FIG. 9, the elements may be implemented by one antenna module 900. Alternatively, the second antenna element 912 and the signal path from the second port 920 to the second coupler element 925 may be implemented by a second antenna module. Correspondingly, the transmit paths of a device may be connected to the ports of the first antenna module and at least one port of the second antenna module, for example.

As an example, the first port 905 may be connected to a cellular transceiver (e.g. GSM or LTE) and the second port 920 may be connected to a WLAN transceiver.

The elements and couplers may be matched as shown in FIG. 9 when combining 2 cellular elements, with WLAN coupled to the low band element. The 6.2 nH loop inductor (inductor element of the antenna element) is not shown is FIG. 9, since this is not directly part of the match, in this example. FIG. 9 shows an example for a match of indirect feed including WLAN.

Figure 10:
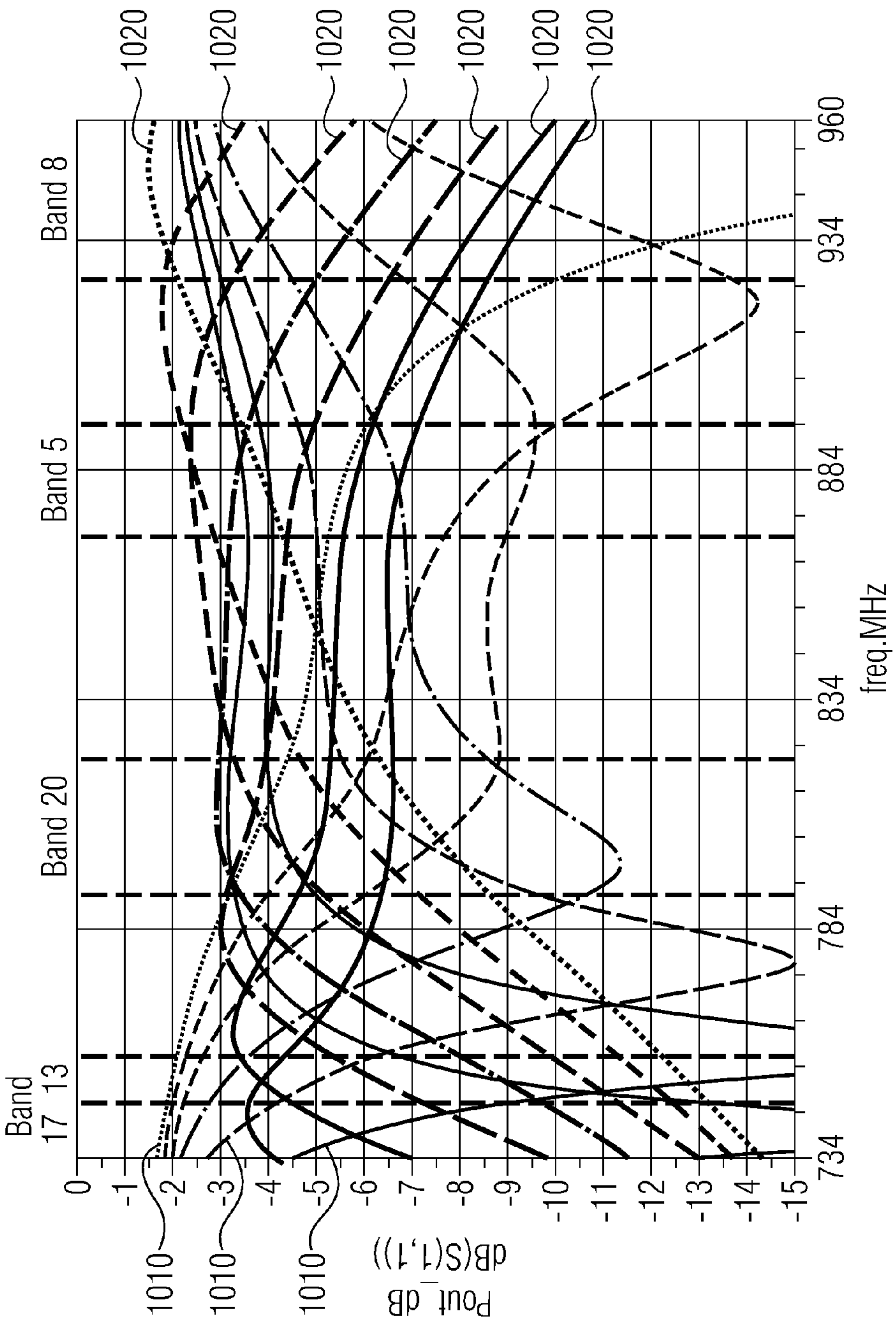
FIG. 10 shows the reflection coefficient S11 and the expected antenna efficiency for different tuning stages for the cellular low band for the antenna module shown in FIG. 9.
Figure 11:
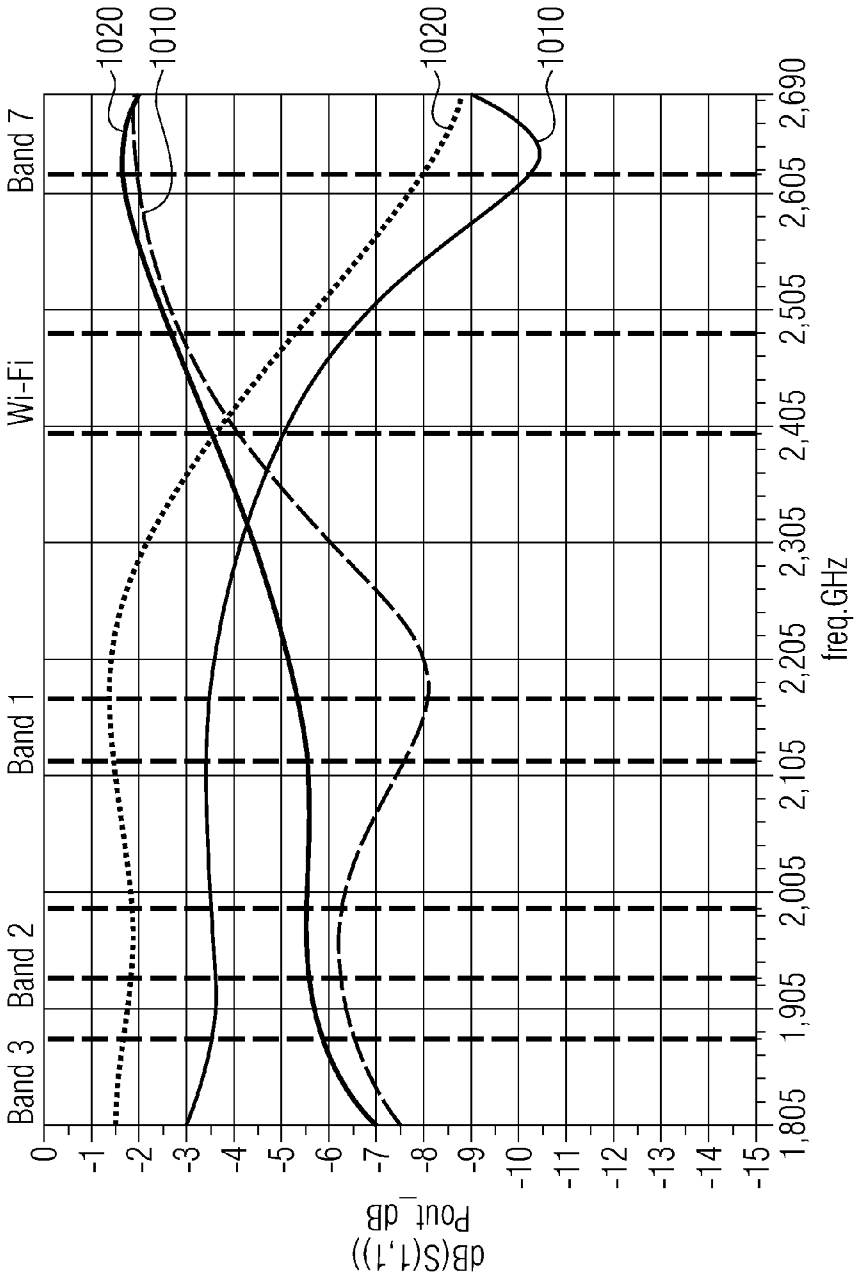
FIG. 11 shows the reflection coefficient S11 and the expected antenna efficiency for the cellular high band for the antenna module shown in FIG. 9.

The inductors and capacitors used in the simulations may be commonly available electrical elements. The switch may be implemented with a Ron of 1.8Ω and a Coff of 0.15 pF and the tunable capacitor may be implemented with a Q of 60. The S11 1010 and expected antenna efficiency 1020 for the different tuning/switching stages are shown for cellular low band in FIG. 10 and high band in FIG. 11. FIGS. 10 and 11 show S11 and expected antenna efficiency for 7 low band stages and 2 high band stages. FIG. 10 indicates the reflection coefficient S11 and the expected antenna efficiency Pout in dB over frequencies of 0.73 GHz to 0.96 GHz. FIG. 11 indicates the reflection coefficient S11 and the expected antenna efficiency Pout in dB over frequencies of 1.80 GHz to 2.69 GHz.

Figure 12:
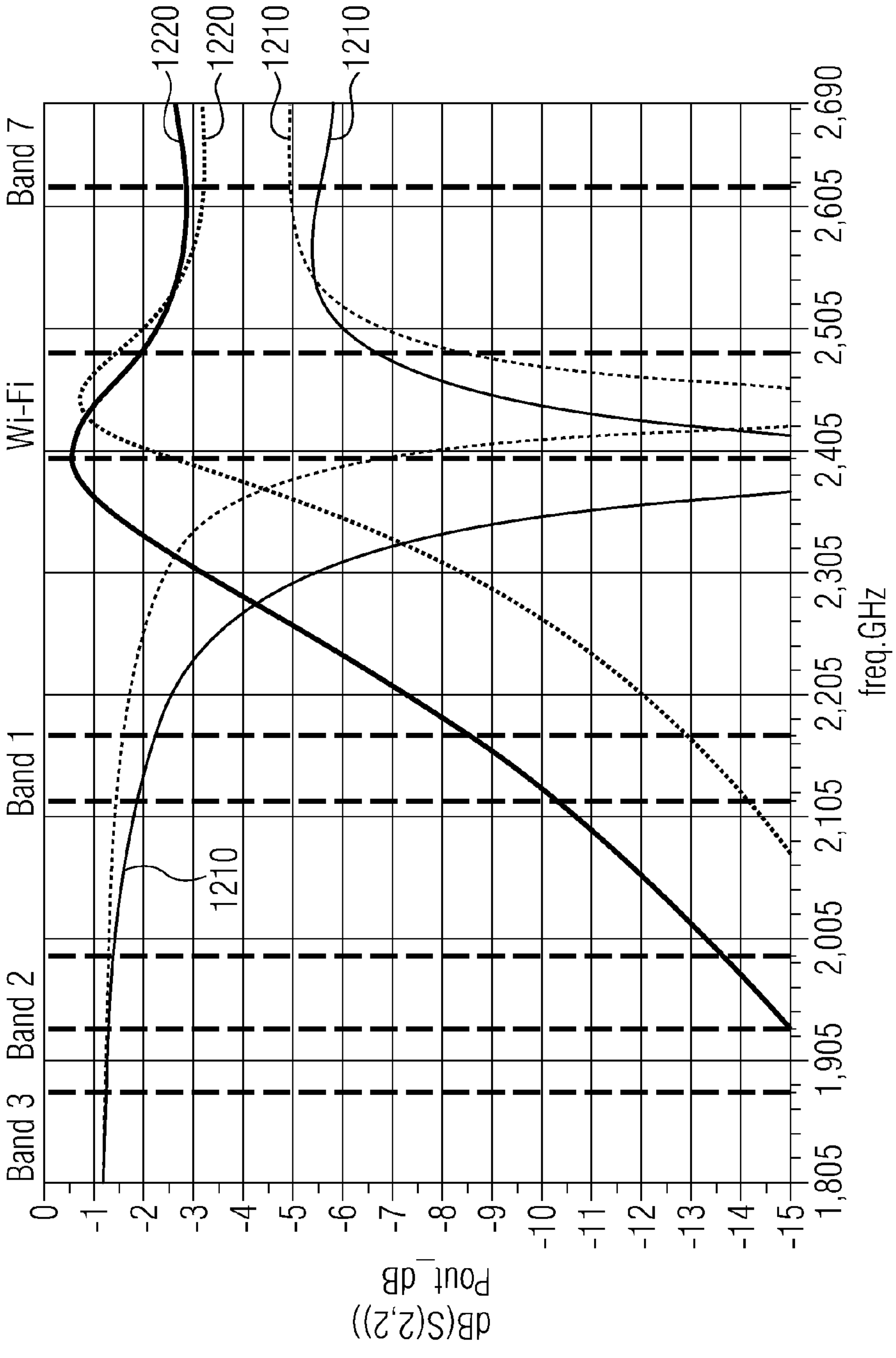
FIG. 12 shows the reflection coefficient S11 and the expected antenna efficiency for WLAN low band frequencies for different stages for the antenna module shown in FIG. 9.
Figure 13:
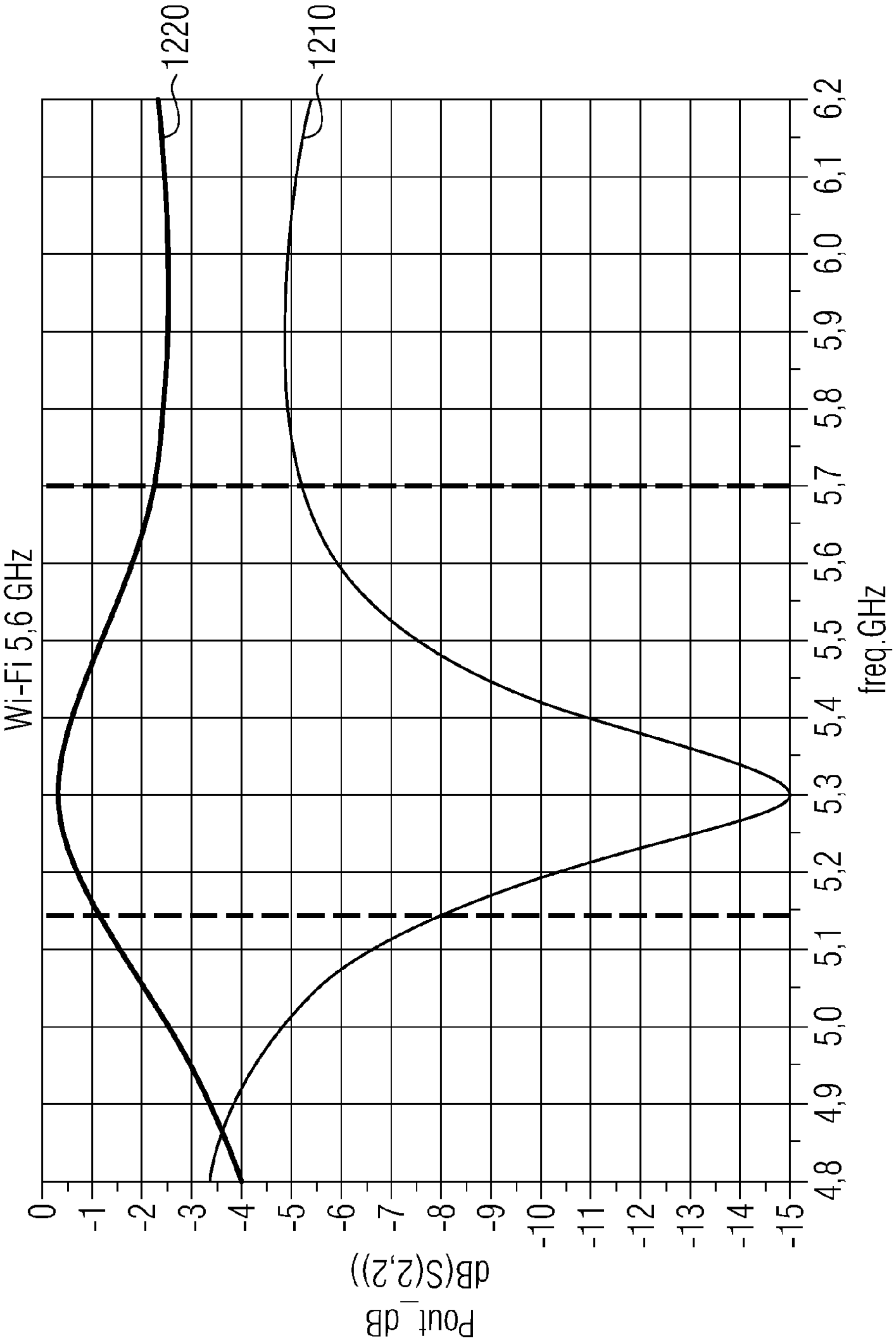
FIG. 13 shows the reflection coefficient S11 and the expected antenna efficiency for the WLAN high band frequencies for the antenna module shown in FIG. 9.

The S11 and expected antenna efficiency for WLAN 2.4 GHz and 5.6 GHZ are shown in FIG. 12. The two stages shown for the 2.4 GHz illustrate the effect of the cellular low band tuning for minimum and maximum frequency, for example. FIGS. 12 and 13 show S11 1210 and expected antenna efficiency 1220 for WLAN 2.4 GHz and WLAN 5.6 GHz. FIG. 12 indicates the reflection coefficient S11 and the expected antenna efficiency Pout in dB over frequencies of 1.80 GHz to 2.69 GHz. FIG. 13 indicates the reflection coefficient S11 and the expected antenna efficiency Pout in dB over frequencies of 4.8 GHz to 6.2 GHz.

Figure 14:
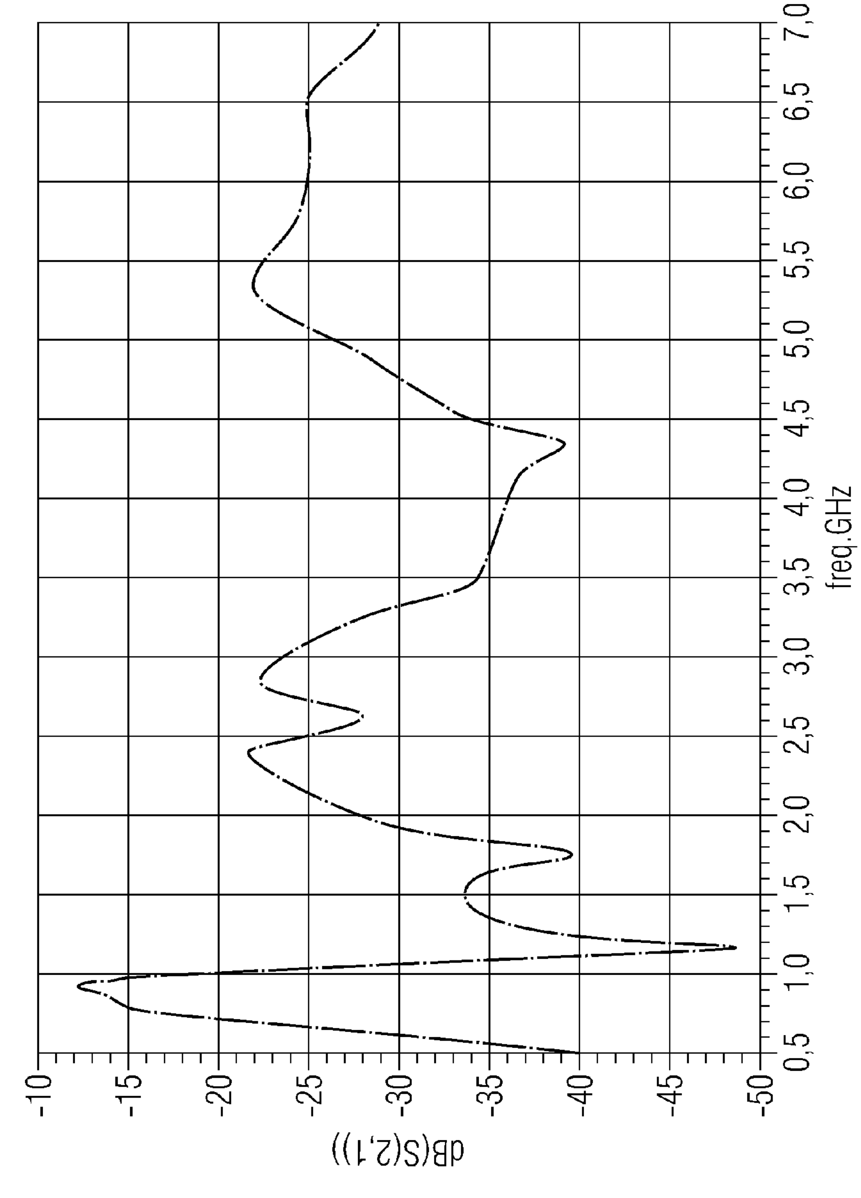
FIG. 14 shows the reflection coefficient S21 between the cellular and WLAN frequencies for the antenna module shown in FIG. 9.

The isolation between cellular and WLAN (first and second signal path) is shown in FIG. 14.

The isolation curve shown in FIG. 14 is for the high band element tuned to the highest frequency range, since this is overlapping with WLAN 2.4 GHz, for example. Low band element may also be tuned to the highest frequency. Isolation values better than −12 dB can be observed for cellular low band, better than −25 dB for cellular high band, better than −20 dB for WLAN 2.4 GH and better the −20 dB for WLAN 5.6 GHz.

Figure 15:
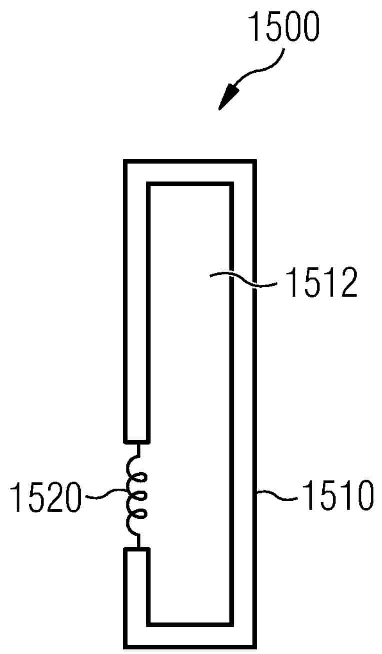
FIG. 15 shows a schematic illustration of an antenna element of an antenna module.

FIG. 15 shows an antenna module 1500 with an antenna element for wireless communication according to an example. The antenna element comprising an electrical conductive element 1510 partly enclosing a slot or opening 1512 and an inductor element 1520 electrically connected to the electrical conductive element 1510 so that the electrical conductive element 1510 and the inductor element 1520 implement a loop enclosing the slot. In other words, the antenna element comprises an electrical conductive element

1510 partly enclosing a slot 1512 or opening and an inductor element 1520 electrically connecting ends of the electrical conductive element 1510 so that the slot 1512 is enclosed by the electrical conductive element 1510 and the inductor element 1520.

By enclosing a slot by an electrically conductive element 1510 and an inductor 1520, an antenna element with at least two resonant frequencies may be provided. For example, a first resonance frequency results from a monopole mode of the antenna element and a second resonance frequency may result from a loop mode (the loop implemented by the electrical conductive element and the inductor surrounding the slot). In this way, signals with different frequency ranges can be transmitted or received simultaneously through the same antenna element with good quality while only little space may be required for implementing the antenna module 1500.

The inductor element 1520 of the antenna element of the antenna module 1500 may be used to set at least one resonant frequency of the antenna element to a desired frequency, for example.

The antenna element of the antenna module 1500 may be connected to a single port (e.g. for providing or receiving signals in different frequency ranges) or at least to two ports as shown in FIG. 1, 2, 4 or 9.

The antenna module 1500 may comprise one or more optional additional features corresponding to the proposed concept or one or more examples described above (e.g. FIGS. 1 to 14).

For example, the antenna module 1500 may comprise a coupler element connected to a first port and arranged in the proximity of the antenna element so that the coupler element is capacitively or inductively coupled to the antenna element in order to transmit or receive a first radio frequency signal through the antenna element.

Optionally, the antenna module 1500 may comprise also a second coupler element connected to a second port and arranged in the proximity of the antenna element so that the second coupler element is capacitively or inductively coupled to the antenna element in order to transmit or receive a second radio frequency signal through the antenna element, for example.

Figure 16:
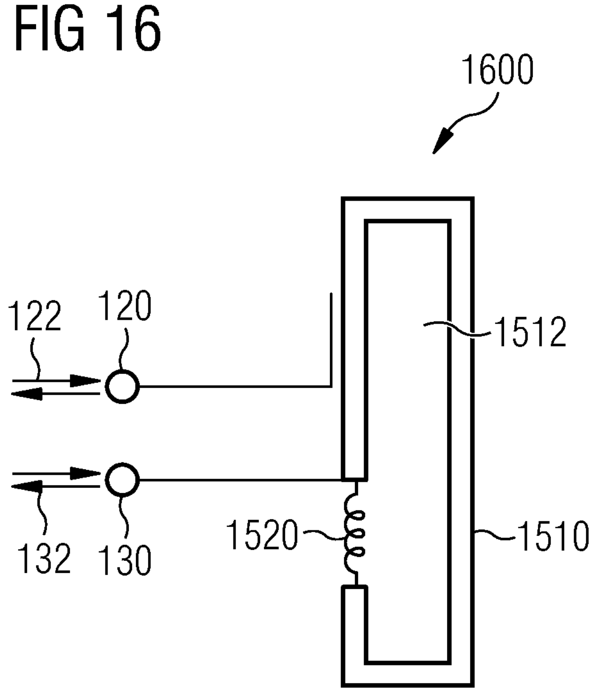
FIG. 16 shows a schematic illustration of an antenna module.

Alternatively, the second port is optionally connected (e.g. through an optional matching or isolation capacitor) to the antenna element. FIG. 16 shows a schematic illustration of an antenna module 1600 according to an example. The implementation of the antenna module 1600 is similar to the implementation shown in FIG. 1 in connection with the antenna element shown in FIG. 15, for example.

Figure 17:
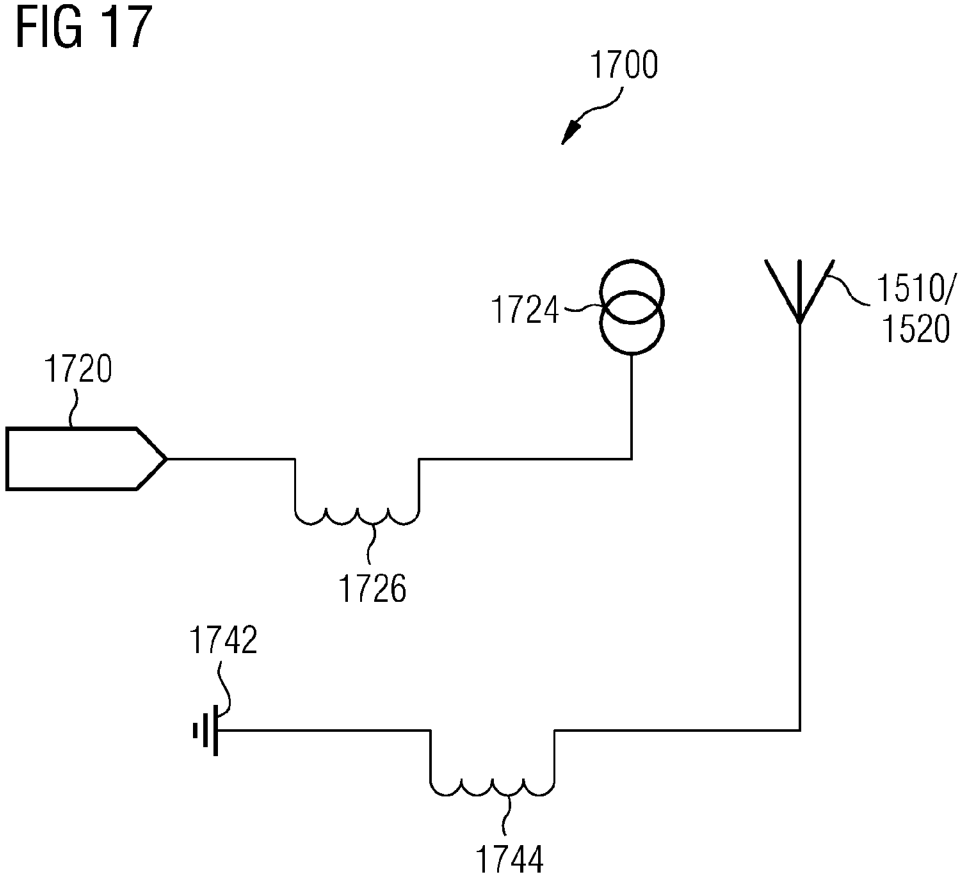
FIG. 17 shows a block diagram of an antenna module.

FIG. 17 shows a block diagram of an antenna module 1700 using an antenna element shown in FIG. 15 in combination with a single port 1720 for providing or receiving signals to be sent or received through the antenna element 1510, 1520 according to an example. The first port 1720 (e.g. for receiving cellular low band and high band frequencies) is connected to a coupler element 1724 through a matching inductor element (e.g. cellular match inductor of 27 nH, for example) 1726. The coupler element 1724 is capacitively or inductively coupled to the antenna element 1510, 1520. The antenna element 1510, 1520 is connected to a third port connectable to a reference potential 1742 (e.g. ground) through a resonator inductor element 1744 (e.g. cellular resonator inductor of 20 nH, for example). More details and aspects are mentioned in connection with the examples described above.

Some examples relate to a mobile device comprising an antenna module according to the described concept or one or more examples described above.

Figure 18:
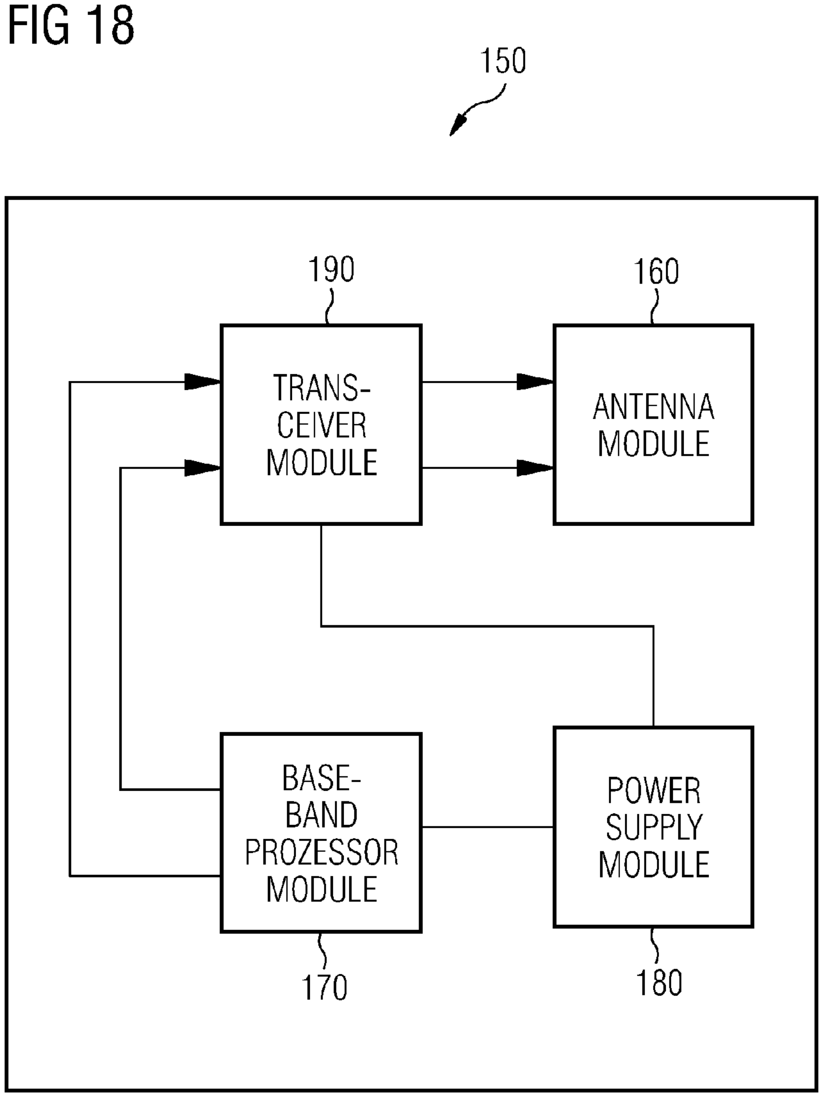
FIG. 18 shows a schematic block diagram of a mobile device.

FIG. 18 shows a block diagram of a mobile device 150 according to an example. The mobile device 150 comprises an antenna module 160 as described in connection with the proposed concept or one or more examples described above (e.g. FIG. 1, 2, 4, 15 or 16). Further, the mobile device 150 comprises a baseband processor module 170 generating at least two baseband signals and a transceiver module 190, at least converting the two baseband signals to two radio frequency signals and providing the two radio frequency signals to the two ports of the antenna module 160. Further, the mobile device 150 comprises a power supply unit 180 supplying at least the baseband processor module 170 and the transceiver module 190.

The mobile device 150 may only require little space for the antenna module while providing signals radiated to external devices or received from external devices with high quality. In this way, a smaller mobile device may be provided or more space may be available for other components within the mobile device, for example.

Alternatively, the mobile device 150 may comprise different transceiver modules for at least the two radio frequency signals provided or received from the two ports of the antenna module 160. Further, also two independent baseband processor modules may provide the baseband signals to the two independent transceiver modules. For example, a baseband processor module and a transceiver module for cellular communication (e.g. GSM, UMTS or LTE) and a baseband processor module and a transceiver module for WLAN or GPS applications may be used.

In other words, the mobile device 150 may comprise two receiver modules and one antenna module according to the proposed concept or one or more examples described above. In this example, a first transceiver module may comprise a first transmit path connected to the first port of the antenna module 160 and a second transceiver module may comprise a second transmit path connected to the second port of the antenna module 160.

Figure 19:
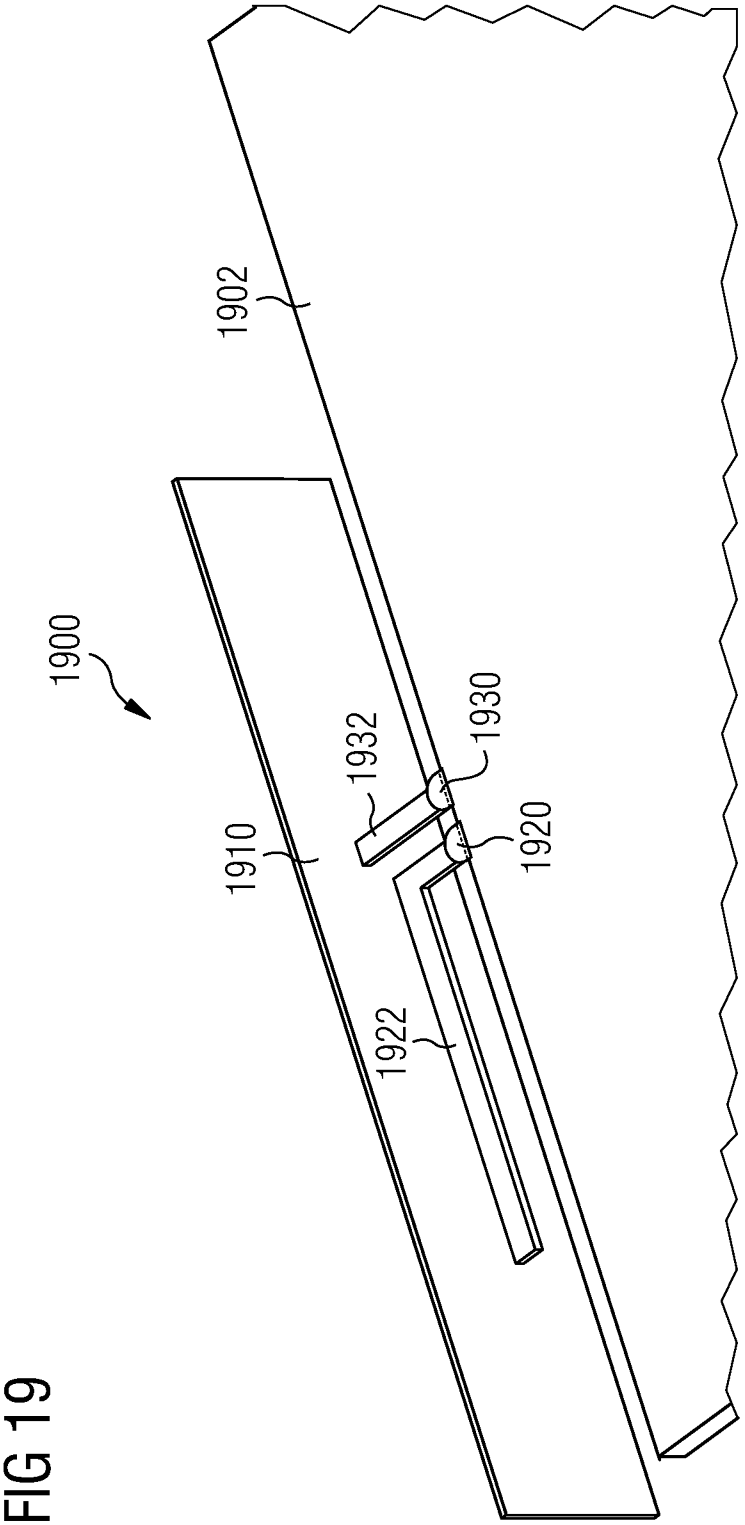
FIG. 19 shows a schematic illustration of an antenna module.

FIG. 19 shows a schematic illustration of a part of a mobile device 1900 according to an example. The mobile device 1900 comprises a printed circuit board 1902 (e.g. carrier for one or more transceiver modules, baseband processor modules and/or power supply modules as well as other components of a mobile device) and an antenna module comprising an antenna element 1910 capacitively or inductively coupled to a first port 1920 and electrically connected to a second port 1930. The first port 1920 is capacitively or inductively coupled to the antenna element 1910 through a coupler element 1922 and the second port 1930 is electrically connected to the antenna element 1910 through an electrical connection 1932.

In this example, the antenna element 1910 comprises a basically rectangular shape without a slot. The implementation of the antenna module may be based on the implementation shown in FIG. 1 or FIG. 4, for example. FIG. 19 shows an example, of an indirect feeding technique (for the first signal path).

The antenna module may consist of an element and a coupler, as shown in FIG. 19. The element may be connected directly to ground (PCB), if the element itself is resonating at a desired frequency, otherwise it may be connected through an inductor to ground in order to force the element to resonate at the right frequency. An inductor may be used in mobile devices (e.g. smartphone) antenna design at low frequencies (700 MHz to 960 MHz), since the volume allocated for the low band antenna is often insufficient for resonating naturally at the desired frequency, for example. The feed signal is connected to the coupler 1922, which indirectly feeds the antenna element. This method of feeding may increase the bandwidth by up to 70% compared to direct fed antennas, for example.

The example shown in FIG. 19 may comprise a (60*125) mm PCB and an (8*43.5) mm element placed in extension of the PCB and with a cutback of 5 mm, for example. The element 1910 and coupler 1922 may be matched as shown in FIG. 4 or 17, for example. The distance between the printed circuit board 1902 and the antenna module may be selected as large as possible within the mobile device in order to reduce the coupling between the ground of the printed circuit board 1902 and the potential of the antenna element, for example.

Figure 20A:
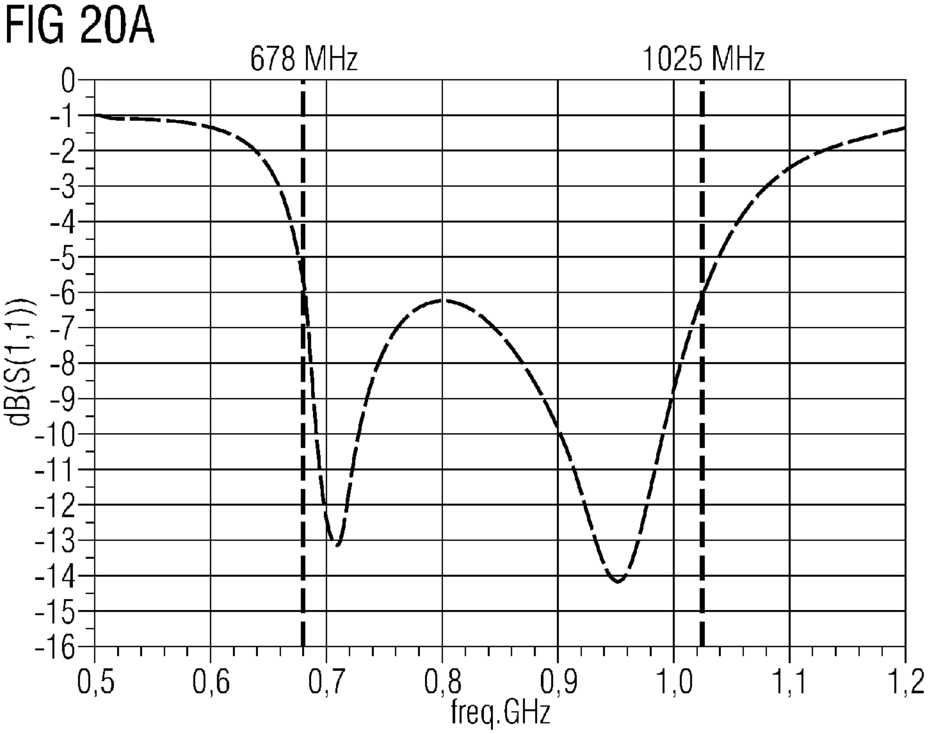
FIG. 20A shows the reflection coefficient S11 for cellular low band frequencies for the antenna module shown in FIG. 19.

The cellular S11 and complex impedance of the indirect feeding technique is schematically shown in FIG. 20A, where it is shown that the bandwidth at S11 at −6 dB is 347 MHz, which may correspond to a relative bandwidth of approximately 41%, for example. FIG. 20A indicates the reflection coefficient S11 in dB over frequencies of 0.5 GHz to 1.2 GHz.

Figure 21:
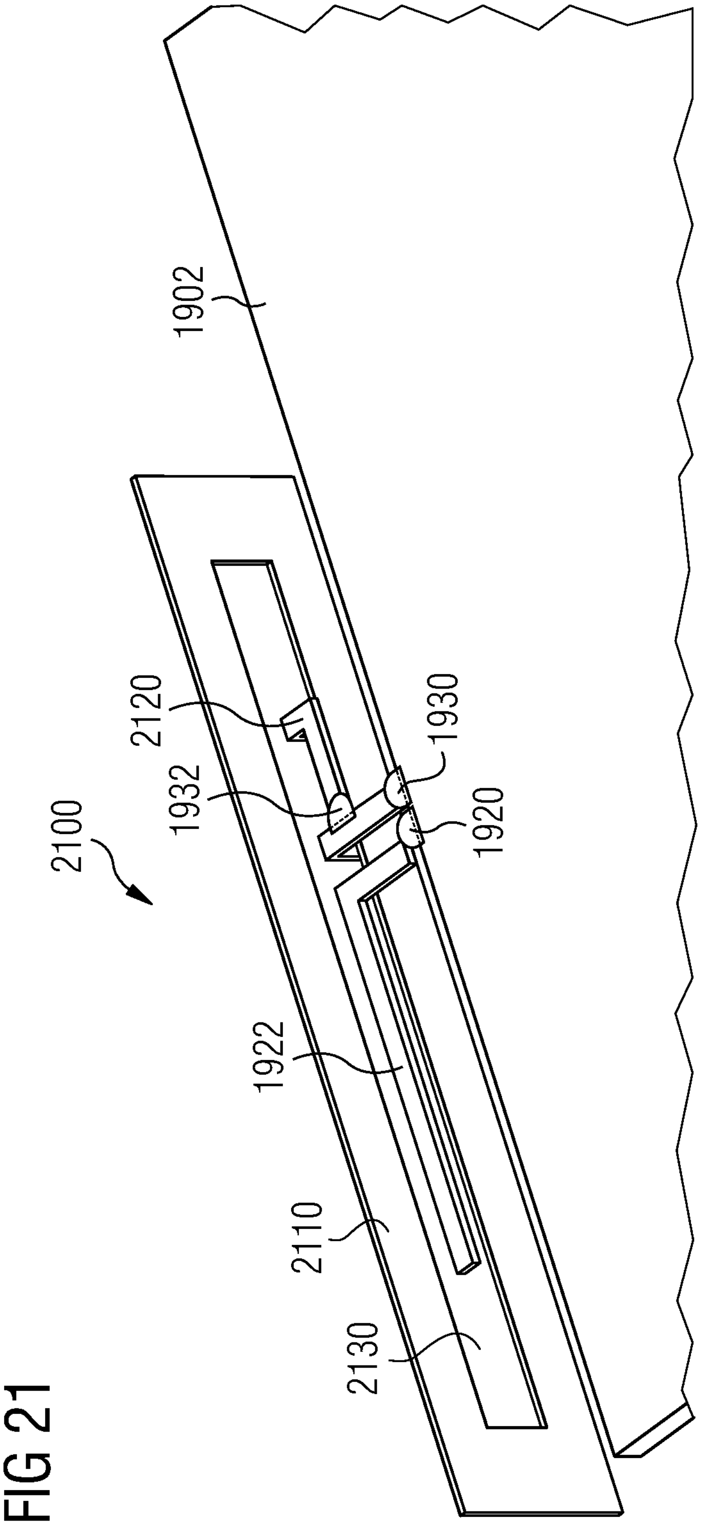
FIG. 21 shows a schematic illustration of an antenna module.

FIG. 21 shows a schematic illustration of a part of a mobile device 2100 according to an example. The implementation of the mobile device 2100 is similar to the implementation shown in FIG. 19. However, the antenna element is implemented similar to the antenna element shown in FIG. 15. The antenna element comprises an electrically conductive element 2110 (e g laminar shape) and an inductor element 2120 enclosing a slot 2130. A first signal with a first frequency range is provided or received through the first port 1920 and a second signal with a second frequency range is provided or received through the second port 1930. More details and aspects are explained in connection with the proposed concept or examples described above (e.g. FIG. 1, 2, 9, 15 or 16).

For example, FIG. 21 may implement a multi coupled element MCE concept by coupling the WLAN signal directly on to the (antenna) element 2110, since the low band cellular signal is coupled to the coupler 1922. The element and the 20 nH inductor to ground, may act as a monopole antenna resonating at approximately 850 MHz and not 2.4 GHz, which may be necessary for WLAN Operation, for example. The 2.4 GHz resonating mode may be obtained by adding an open slot to the element and then shorten the slot with an inductor, as shown in FIG. 21, for example. In other words, FIG. 21 may show an indirect feeding technique including an open slot (MCE).

The slot 2130 in the element 2110 and the inductor 2120 may act as a loop like antenna at 2.4 GHz, while the monopole mode at 850 MHz is maintained, as shown in FIG. 3A-3B, for example. The resonance frequency of the loop mode may be fine-tuned by adjusting the value of the loop inductor 2120.

Figure 22:
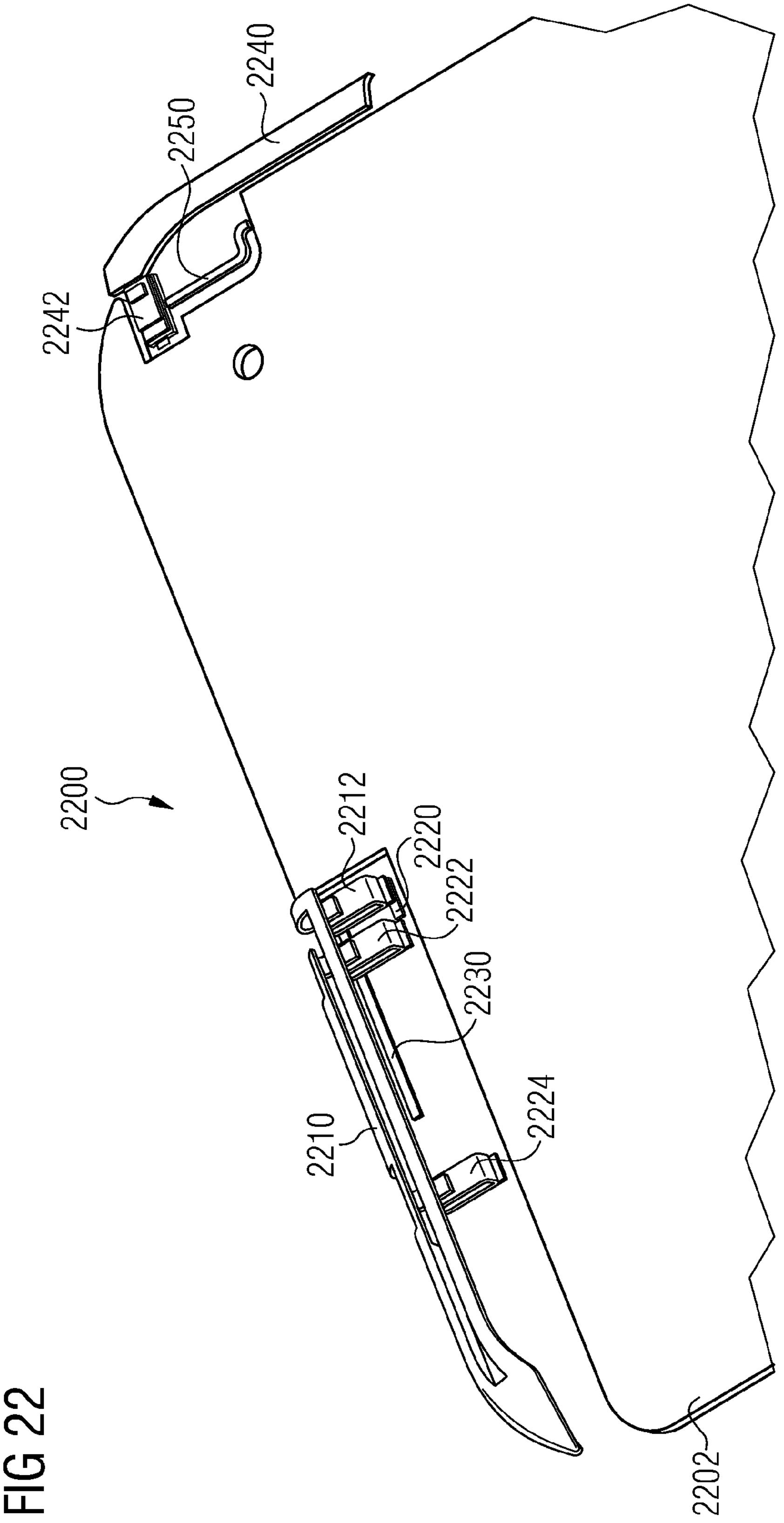
FIG. 22 shows a schematic illustration of a mobile device with two antenna modules.

FIG. 22 shows a schematic illustration of a part of a mobile device 2200 according to an example. The implementation of the mobile device 2200 is similar to the implementation shown in FIG. 21. However, the mobile device 2200 comprises a second antenna module for at least a third radio frequency signal with a third frequency range. In this example, the geometry of the antenna element 2210 of the first antenna module comprises a three-dimensional laminar shape adapted to the available space within the mobile device 2200. The antenna element comprises an electrically-conductive element 2210 with a slot and a gap. The gap is closed by an inductor element 2220 connected to the ends of the electrically conductive element supported by feeding springs 2222. A first signal with a first frequency range can be transmitted or received through the antenna element (e.g. element for low band and WLAN) through a capacitively or inductively coupled coupler element 2230 (e.g. coupler low band). Further, the second signal can be transmitted or received through a connection of a transceiver through one of the feeding springs 2222. Further, a third feeding spring 2224 may provide a connection for a low band resonance tuning capacitor (e.g. variable capacitor as shown in FIG. 9). The printed circuit boards 2202 may provide space for mounting one or more transceiver modules, one or more baseband processor modules, a power supply module as well as other components required for the mobile device 2200. The second antenna module may comprise an antenna element 2240 (e.g. element for high band) with only a single resonance frequency for transmitting a third signal with a third frequency range (e.g. cellular high band frequency) connected to a reference potential through a feeding spring 2242. The third signal may be capacitively or inductively coupled to the antenna element 2240 through a coupler element 2250 (e.g. coupler high band) in the proximity of the antenna element 2240 of the second antenna module, for example.

The mobile device 2200 may comprise an antenna structure corresponding to the block diagram shown in FIG. 9, for example. FIG. 11 may show a computer added design (CAD) of the antennas.

In other words, the mobile device 2200 may comprise a second antenna module connected to a third transmit path of a transceiver module (e.g. independent or the same providing the first and/or second radio frequency signal) for transmitting or receiving a third signal with a third frequency range.

Optionally, the antenna element for transmitting or receiving signals of the second antenna module comprises the largest expansion in a direction comprising an angle between 45° and 135° (or between 60° and 120° or between 80° and 100°, for example 80°, 90° or 100°) to a direction of the largest dimension of the antenna element of the first antenna module. In other words, the antenna elements of the two antenna modules may be arranged orthogonal to each other in order to reduce the influence from one to the other, for example.

For example, the antenna element 2240 of the second antenna module may be configured to transmit a third radio frequency signal comprising mainly frequencies higher than 1500 MHz, for example.

FIG. 22 may show a schematic implementation of the MCE concept on a smartphone, where also the cellular high band is included, for example.

The cellular low band and high band elements are separated in space to achieve good isolation between WLAN 2.4 GHz on the low band element and cellular high band operation on the high band element. The indirect feed concept can be combined to a dual resonance system by using two elements, one for low band operation and one for high band operation. The 2 elements may be positioned close together for cellular operation only. Also, the concept can be combined from single feed to dual feed system and is shown in the following example as a single feed system, for example.

The concept shown in FIG. 22 may be a diversity antenna with limited volume, which may require tuning and switching in order to cover the required frequency ranges. The cellular low band element may be tuned by having a tunable capacitor connected between the element and ground, as shown in FIGS. 22 and 9, for example. The high band element may be switched between two stages at the grounding point of the element, as shown in FIG. 9.

A mobile device mentioned above may be a cell phone, a laptop or a tablet, for example.

Some examples relate to a cell phone comprising an antenna module according to the proposed concept or one or more examples described above.

Further, some examples relate to a base station or a relay station of a mobile communication system comprising antenna module according to the described concept or one or more examples described above.

A mobile or wireless communication system may, for example, correspond to one of the mobile communication systems standardized by the 3rd Generation Partnership Project (3GPP), e.g. Global System for Mobile Communications (GSM), Enhanced Data rates for GSM Evolution (EDGE), GSM EDGE Radio Access Network (GERAN), High Speed Packet Access (HSPA), Universal Terrestrial Radio Access Network (UTRAN) or Evolved UTRAN (E-UTRAN), Long Term Evolution (LTE) or LTE-Advanced (LTE-A), or mobile communication systems with different standards, e.g. Worldwide Interoperability for Microwave Access (WIMAX) IEEE 802.16 or Wireless Local Area Network (WLAN) IEEE 802.11, generally any system based on Time Division Multiple Access (TDMA), Frequency Division Multiple Access (FDMA), Orthogonal Frequency Division Multiple Access (OFDMA), Code Division Multiple Access (CDMA), etc. The terms mobile communication system and mobile communication network may be used synonymously.

The mobile communication system may comprise a plurality of transmission points or base station transceivers operable to communicate radio signals with a mobile transceiver. In these examples, the mobile communication system may comprise mobile transceivers, relay station transceivers and base station transceivers. The relay station transceivers and base station transceivers can be composed of one or more central units and one or more remote units.

A mobile transceiver or mobile device may correspond to a smartphone, a cell phone, User Equipment (UE), a laptop, a notebook, a personal computer, a Personal Digital Assistant (PDA), a Universal Serial Bus (USB)-stick, a tablet computer, a car, etc. A mobile transceiver or terminal may also be referred to as UE or user in line with the 3GPP terminology. A base station transceiver can be located in the fixed or stationary part of the network or system. A base station transceiver may correspond to a remote radio head, a transmission point, an access point, a macro cell, a small cell, a micro cell, a pico cell, a femto cell, a metro cell etc. The term small cell may refer to any cell smaller than a macro cell, i.e. a micro cell, a pico cell, a femto cell, or a metro cell. Moreover, a femto cell is considered smaller than a pico cell, which is considered smaller than a micro cell. A base station transceiver can be a wireless interface of a wired network, which enables transmission and reception of radio signals to a UE, mobile transceiver or relay transceiver. Such a radio signal may comply with radio signals as, for example, standardized by 3GPP or, generally, in line with one or more of the above listed systems. Thus, a base station transceiver may correspond to a NodeB, an eNodeB, a BTS, an access point, etc. A relay station transceiver may correspond to an intermediate network node in the communication path between a base station transceiver and a mobile station transceiver. A relay station transceiver may forward a signal received from a mobile transceiver to a base station transceiver, signals received from the base station transceiver to the mobile station transceiver, respectively.

The mobile communication system may be cellular. The term cell refers to a coverage area of radio services provided by a transmission point, a remote unit, a remote head, a remote radio head, a base station transceiver, relay transceiver or a NodeB, an eNodeB, respectively. The terms cell and base station transceiver may be used synonymously. In some examples a cell may correspond to a sector. For example, sectors can be achieved using sector antennas, which provide a characteristic for covering an angular section around a base station transceiver or remote unit. In some examples, a base station transceiver or remote unit may, for example, operate three or six cells covering sectors of 120° (in case of three cells), 60° (in case of six cells) respectively. Likewise a relay transceiver may establish one or more cells in its coverage area. A mobile transceiver can be registered or associated with at least one cell, i.e. it can be associated to a cell such that data can be exchanged between the network and the mobile in the coverage area of the associated cell using a dedicated channel, link or connection. A mobile transceiver may hence register or be associated with a relay station or base station transceiver directly or indirectly, where an indirect registration or association may be through one or more relay transceivers.

Some examples relate to an antenna module for wireless communication comprising an antenna element comprising a first resonance frequency and a second resonance frequency. Further, the antenna module comprises means for receiving or providing a first radio frequency signal with a first frequency range and means for receiving or providing a second radio frequency signal with a second frequency range, wherein the first frequency range and the second frequency range are different from each other. The first resonance frequency is located in the first frequency range and the second resonance frequency is located in the second frequency range, wherein the antenna element is configured to transmit or receive the first radio frequency signal and the second radio frequency signal simultaneously.

The antenna module may comprise one or more additional optional features corresponding to one or more aspects mentioned in connection with the proposed concept or one or more examples described above.

Figure 23:
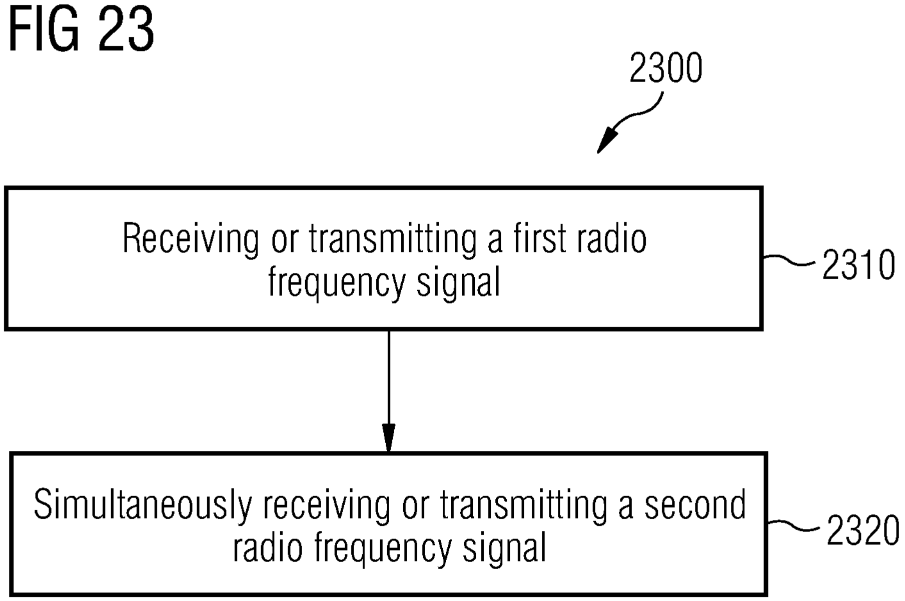
FIG. 23 shows a flowchart of a method for wireless communication.

FIG. 23 shows a flow chart of a method 2300 for wireless communication through an antenna element comprising a first resonance frequency and a second resonance frequency according to an example. The method 2300 comprises receiving or transmitting 2310 a first radio frequency signal with a first frequency range by the antenna element. The first radio frequency signal is received for transmission or provided after receipt by a first port. Further, the method 2300 comprises simultaneously receiving or transmitting 2320 a second radio frequency signal with a second frequency range by the antenna element. The second radio frequency signal is received for transmission or provided after receipt by a second port. Further, the first frequency range and the second frequency range are different from each other.

Some examples relate to a multi coupled (antenna) element. The multi coupled antenna element may provide a compact antenna design. The multi coupled antenna element may be implemented in high volume architectures (e.g. cell phone) or low volume architectures (e.g. test systems or design/debug tools).

For example, the space for good antenna performance on a modern smartphone is very limited and it may be desired if some of the wireless systems and/or cellular bands could share the same antenna element and operate simultaneously without a significant degradation of the performance and reduce the total number of antenna elements needed in the phone. The proposed concept shows a way of simultaneously coupling multiple wireless systems, like one cellular band and 2 WLAN bands on to the same antenna element, without significantly degrading the performance of either system, for example.

In comparison to sharing of an antenna element between for example GPS and WLAN by making a single feed dual resonance antenna and then feeding the GPS and WLAN signal through a duplexer/diplexer to the antenna, the proposed concept may avoid the added insertion loss of 1 dB to 2 dB of the duplex filter.

The proposed antenna module may occupy less volume then 2 separate single feed single resonance antennas.

In comparison to a switched solution, where each system/band may be switched on and off to the antenna element, so that only one band/system is coupled to the antenna element at a time, the proposed concept may support concurrent operation and may avoid loss due to the switches and the single or dual feed antenna element with dual resonances.

The proposed concept may introduce a method for coupling multiple cellular bands and/or wireless systems, like for example the cellular bands between 700 MHz to 960 MHz and the 2.4 GHz and 5.6 GHz WLAN onto the same antenna element, without (or without significantly) increasing the volume of the antenna element needed to cover the low band frequencies (700 MHz to 960 MHz) and without significantly reducing the achieved radiated performance (Multiple Coupled Element (MCE)), for example. This may reduce the number of needed antenna elements in wireless devices and more compact stack-ups may be made and/or more metal may be accepted on the phone, giving more degrees of freedom to the industrial designers, for example.

The mentioned MCE concept may require less volume than a single/dual feed dual resonance antenna element configuration using either a duplexer/diplexer or switches, while the performance of the lowest frequency operating system may be kept, and the performance of the high frequency operation system may in some cases be improved, for example. The proposed concept may avoid expensive and lossy duplexer/diplexer or switches, for example.

For example, a chip set may require 2*2 MIMO WLAN, which may require 2 WLAN antennas. It may be possible to avoid adding a second WLAN antenna reducing the added cost and space limitations, in for example a smartphone. This may be enabled by the MCE concept, since the 2 WLAN antennas may be implemented together with the low band main antenna and the low band diversity antenna avoiding an additional separate WLAN antenna, for example.

In other words, the MCE concept may reduce the number of separate antenna needed in at wireless device using WLAN, which may free up space for other components or for a more appealing industrial design, for example.

In the following examples pertain to further examples. Example 1 is an antenna module for wireless communication comprising an antenna element comprising a first resonance frequency and a second resonance frequency, a first port configured to receive or provide a first radio frequency signal with a first frequency range and a second port configured to receive or provide a second radio frequency signal with a second frequency range, wherein the first frequency range and the second frequency range are different from each other, wherein the first resonance frequency is located in the first frequency range and the second resonance frequency is located in the second frequency range, wherein the antenna element is configured to transmit or receive the first radio frequency signal and the second radio frequency signal simultaneously.

In example 2, the subject matter of example 1 can optionally include a third port electrically connected to the antenna element, wherein the third port is configured to be electrically connected to a reference potential.

In example 3, the subject matter of example 2 can optionally include an inductor element arranged between the antenna element and the third port.

In example 4, the subject matter of example 3 can optionally include the inductor element configured to influence the first resonance frequency so that the first resonance frequency is located in the first frequency range.

In example 5, the subject matter of any one of examples 1-4 can optionally include the antenna element being a single antenna element.

In example 6, the subject matter of any one of examples 1-5 can optionally include the antenna element comprising an electrical conductive element at least partly enclosing a slot.

In example 7, the subject matter of example 6 can optionally include the electrical conductive element of the antenna element enclosing partly the slot, wherein the antenna element comprises an inductor element electrically connected to the electrical conductive element so that the electrical conductive element and the inductor element implement a loop enclosing the slot.

In example 8, the subject matter of any one of examples 1-7 can optionally include a coupler element connected to the first port and arranged in the proximity of the antenna element so that the coupler element is capacitively or inductively coupled to the antenna element in order to transmit or receive the first radio frequency signal through the antenna element.

In example 9, the subject matter of example 8 can optionally include the coupler element connected to the first port through a matching element configured to adapt an impedance of the first signal path from the first port to the coupler element to the first resonance frequency of the antenna element so that a reflection coefficient of less than −6 db is obtained for the first radio frequency signal.

In example 10, the subject matter of example 8 or 9 can optionally include a second coupler element connected to the second port and arranged in the proximity of the antenna element so that the second coupler element is capacitively or inductively coupled to antenna element in order to transmit or receive the second radio frequency signal through the antenna element.

In example 11, the subject matter of example 8 or 9 can optionally include the second port connected to the antenna element.

In example 12, the subject matter of example 11 can optionally a third port electrically connected to the antenna element through a variable tuning capacitor, wherein the third port is configured to be electrically connected to a reference potential.

In example 13, the subject matter of example 12 can optionally include the matching capacitor configured to damp frequencies of the first radio frequency signal so that signal portions caused by the first radio frequency signal provided at the second port are less than −10 db.

In example 14, the subject matter of any one of examples 8-13 can optionally include the coupler element electrically insulated from a third port electrically connected to the antenna element, wherein the third port is configured to be electrically connected to a reference potential.

In example 15, the subject matter of any one of examples 1-14 can optionally include the antenna element configured so that the first resonance frequency is lower than 1 GHz and the second resonance frequency is higher than 1 GHz.

In example 16, the subject matter of example 15 can optionally the antenna element is configured so that the first resonance frequency is between 600 MHz and 1000 MHz and the second resonance frequency is between 2.2 GHz and 3.0 GHz.

In example 17, the subject matter of any one of examples 1-16 can optionally include the antenna element comprising a laminar shape.

In example 18, the subject matter of example 17 can optionally include a dimension of the antenna element in a first direction along the laminar shape being more than 5 times a dimension of the antenna element in a second direction along the laminar shape, wherein the first direction is orthogonal to the second direction.

In example 19, the subject matter of example 18 can optionally include the antenna element comprising a slot within the laminar shape, wherein a dimension of the slot in the first direction is more than 5 times a dimension of the slot in the second direction.

Example 20 is an antenna module for wireless communication comprising an antenna element comprising a first resonance frequency and a second resonance frequency, means for receiving or providing a first radio frequency signal with a first frequency range and means for receiving or providing a second radio frequency signal with a second frequency range, wherein the first frequency range and the second frequency range are different from each other, wherein the first resonance frequency is located in the first frequency range and the second resonance frequency is located in the second frequency range, wherein the antenna element is configured to transmit or receive the first radio frequency signal and the second radio frequency signal simultaneously.

In example 21, the subject matter of example 20 can optionally include the antenna element comprising an electrical conductive element at least partly enclosing a slot.

Example 22 is an antenna module with an antenna element for wireless communication, the antenna element comprising an electrical conductive element partly enclosing a slot and an inductor element electrically connected to the electrical conductive element so that the electrical conductive element and the inductor element implement a loop enclosing the slot.

In example 23, the subject matter of example 21 can optionally include a coupler element connected to a first port and arranged in the proximity of the antenna element so that the coupler element is capacitively or inductively coupled to the antenna element in order to transmit or receive a first radio frequency signal through the antenna element In example 24, the subject matter of example 23 can optionally include a second coupler element connected to a second port and arranged in the proximity of the antenna element so that the second coupler element is capacitively or inductively coupled to the antenna element in order to transmit or receive a second radio frequency signal through the antenna element.

In example 25, the subject matter of example 23 can optionally include the second port being connected to the antenna element.

Example 26 is a mobile device comprising at least two transceiver modules and an antenna module according to one of the examples 1 to 25, wherein a first transceiver module comprises a first transmit path connected to the first port of the antenna module and a second transceiver module comprises a second transmit path connected to the second port of the antenna module.

In example 27, the subject matter of example 26 can optionally include a second antenna module connected to a third transmit path of a transceiver module for transmitting or receiving a third radio frequency signal with a third frequency range.

In example 28, the subject matter of example 27 can optionally include an antenna element for transmitting or receiving signals of the second antenna module comprising a largest expansion in a direction comprising an angle between 45° and 135° to a direction of a largest dimension of the antenna element of the first antenna module.

In example 29, the subject matter of example 27 or 28 can optionally include an antenna element of the second antenna module configured to transmit a third radio frequency signal, wherein the second radio frequency signal and the third radio frequency signal comprise mainly frequencies higher than 1500 MHz.

Example 30 is a cell phone comprising an antenna module according to one of the examples 1 to 25.

Example 31 is a method for wireless communication through an antenna element comprising a first resonance frequency and a second resonance frequency. The method comprises receiving or transmitting a first radio frequency signal with a first frequency range by the antenna element, wherein the first radio frequency signal is received for transmission or provided after receipt by a first port and simultaneously receiving or transmitting a second radio frequency signal with a second frequency range by the antenna element, wherein the second radio frequency signal is received for transmission or provided after receipt by a second port, wherein the first frequency range and the second frequency range are different from each other.

In example 32, the subject matter of example 31 can optionally include the antenna element comprising an electrical conductive element at least partly enclosing a slot.

Example 33 is a machine readable storage medium including program code, when executed, to cause a machine to perform the method of example 31.

Example 34 is a machine readable storage including machine readable instructions, when executed, to implement a method or realize an apparatus as implemented by any one of examples 1-31.

Example 35 is a computer program having a program code for performing the method of example 31, when the computer program is executed on a computer or processor.

Examples may further provide a computer program having a program code for performing one of the above methods, when the computer program is executed on a computer or processor. A person of skill in the art would readily recognize that steps of various above-described methods may be performed by programmed computers. Herein, some examples are also intended to cover program storage devices, e.g., digital data storage media, which are machine or computer readable and encode machine-executable or computer-executable programs of instructions, wherein the instructions perform some or all of the acts of the above-described methods. The program storage devices may be, e.g., digital memories, magnetic storage media such as magnetic disks and magnetic tapes, hard drives, or optically readable digital data storage media. The examples are also intended to cover computers programmed to perform the acts of the above-described methods or (field) programmable logic arrays ((F)PLAs) or (field) programmable gate arrays ((F)PGAs), programmed to perform the acts of the above-described methods.

The description and drawings merely illustrate the principles of the disclosure. It will thus be appreciated that those skilled in the art will be able to devise various arrangements that, although not explicitly described or shown herein, embody the principles of the disclosure and are included within its spirit and scope. Furthermore, all examples recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions. Moreover, all statements herein reciting principles, aspects, and examples of the disclosure, as well as specific examples thereof, are intended to encompass equivalents thereof.

Functional blocks denoted as "means for . . . " (performing a certain function) shall be understood as functional blocks comprising circuitry that is configured to perform a certain function, respectively. Hence, a "means for s.th." may as well be understood as a "means configured to or suited for s.th.". A means configured to perform a certain function does, hence, not imply that such means necessarily is performing the function (at a given time instant).

Functions of various elements shown in the figures, including any functional blocks labeled as "means", "means for providing a sensor signal", "means for generating a transmit signal.", etc., may be provided through the use of dedicated hardware, such as "a signal provider", "a signal processing unit", "a processor", "a controller", etc. as well as hardware capable of executing software in association with appropriate software. Moreover, any entity described herein as "means", may correspond to or be implemented as "one or more modules", "one or more devices", "one or more units", etc. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

It should be appreciated by those skilled in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Furthermore, the following claims are hereby incorporated into the Detailed Description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having means for performing each of the respective acts of these methods.

Further, it is to be understood that the disclosure of multiple acts or functions disclosed in the specification or claims may not be construed as to be within the specific order. Therefore, the disclosure of multiple acts or functions will not limit these to a particular order unless such acts or functions are not interchangeable for technical reasons. Furthermore, in some examples a single act may include or may be broken into multiple sub acts. Such sub acts may be included and part of the disclosure of this single act unless explicitly excluded.

The invention claimed is:

1. An antenna module for wireless communication comprising:

an antenna element comprising a first resonance frequency and a second resonance frequency;

a first port configured to receive or provide a first radio frequency signal with a first frequency range;

a second port configured to receive or provide a second radio frequency signal with a second frequency range, wherein the first frequency range and the second frequency range are different from each other, wherein the first resonance frequency is located in the first frequency range and the second resonance frequency is located in the second frequency range, wherein the antenna element is configured to transmit or receive the first radio frequency signal and the second radio frequency signal simultaneously; and further comprising a coupler element connected to the first port and arranged in the proximity of the antenna element to couple the coupler element capacitively or inductively to the antenna element for transmitting or receiving the first radio frequency signal through the antenna element;

wherein the coupler element is connected to the first port through a matching element configured to adapt an impedance of the first signal path from the first port to the coupler element to the first resonance frequency of the antenna element to obtain a reflection coefficient of less than −6 decibels (dB) for the first radio frequency signal.

2. The antenna module according to claim 1, comprising a third port electrically connected to the antenna element, wherein the third port is configured to be electrically connected to a reference potential.

3. The antenna module according to claim 2, wherein an inductor element is arranged between the antenna element and the third port.

4. The antenna module according to claim 3, wherein the inductor element is configured to change the first resonance frequency to the first frequency range.

5. The antenna module according to claim 1, wherein the antenna element is a single antenna element.

6. The antenna module according to claim 1, wherein the antenna element comprises an electrical conductive element at least partly enclosing a slot.

7. The antenna module according to claim 6, wherein the electrical conductive element of the antenna element encloses partly the slot, wherein the antenna element comprises an inductor element electrically connected to the electrical conductive element to form a loop enclosing the slot with the electrical conductive element and the inductor element implement.

8. The antenna module according to claim 1, further comprising a second coupler element connected to the second port and arranged in the proximity of the antenna element to couple the second coupler element capacitively or inductively to antenna element for transmitting or receiving the second radio frequency signal through the antenna element.

9. The antenna module according to claim 1, wherein the second port is connected to the antenna element.

10. The antenna module according to claim 1, comprising a third port electrically connected to the antenna element through a variable tuning capacitor, wherein the third port is configured to be electrically connected to a reference potential.

11. The antenna module according to claim 1, wherein the antenna element comprises a laminar shape;

wherein a dimension of the antenna element in a first direction along the laminar shape is more than 5 times a dimension of the antenna element in a second direction along the laminar shape, wherein the first direction is orthogonal to the second direction.

12. The antenna module according to claim 11, wherein the antenna element comprises a slot within the laminar shape, wherein a dimension of the slot in the first direction is more than five times a dimension of the slot in the second direction.

13. A mobile device comprising at least two transceiver modules and an antenna module according to claim 1, wherein a first transceiver module comprises a first transmit path connected to the first port of the antenna module and a second transceiver module comprises a second transmit path connected to the second port of the antenna module.

14. The mobile device according to claim 13, further comprising a second antenna module connected to a third transmit path of a transceiver module for transmitting or receiving a third radio frequency signal with a third frequency range;

wherein an antenna element for transmitting or receiving signals of the second antenna module comprises a largest expansion in a direction comprising an angle between 45° and 135° to a direction of a largest dimension of the antenna element of the first antenna module.

15. A method for wireless communication through an antenna element, the method comprising:

receiving or transmitting a first radio frequency signal with a first frequency range by the antenna element, wherein the first radio frequency signal is received for transmission or provided after receiving at a first port; and simultaneously receiving or transmitting a second radio frequency signal with a second frequency range by the antenna element, wherein the second radio frequency signal is received for transmission or provided after receiving at a second port, wherein the first frequency range and the second frequency range are different from each other;

wherein a coupler element connected to the first port and arranged in the proximity of the antenna element couples the coupler element capacitively or inductively to the antenna element for transmitting or receiving the first radio frequency signal through the antenna element; and wherein the coupler element is connected to the first port through a matching element and adapts an impedance of the first signal path from the first port to the coupler element to a first resonance frequency of the antenna element to obtain a reflection coefficient of less than −6 decibels (dB) for the first radio frequency signal.

16. The method of claim 15, wherein a third port is electrically connected to the antenna element, and wherein the third port is configured to be electrically connected to a reference potential.

17. The antenna module according to claim 16, wherein an inductor element is arranged between the antenna element and the third port.

18. The antenna module according to claim 17, wherein the inductor element is configured to change the first resonance frequency to the first frequency range.

19. The antenna module according to claim 15, wherein the antenna element comprises an electrical conductive element at least partly enclosing a slot.

20. The antenna module according to claim 19, wherein the electrical conductive element of the antenna element encloses partly the slot, wherein the antenna element comprises an inductor element electrically connected to the electrical conductive element to form a loop enclosing the slot with the electrical conductive element and the inductor element implement.

* * * * *

UNITED STATES PATENT AND TRADEMARK OFFICE
CERTIFICATE OF CORRECTION

PATENT NO. : 9,627,770 B2
APPLICATION NO. : 14/478388
DATED : April 18, 2017
INVENTOR(S) : Svendsen et al.

It is certified that error appears in the above-identified patent and that said Letters Patent is hereby corrected as shown below:

On the Title Page

Item (30), in "Foreign Application Priority Data", in Column 1, Line 1, delete "10 2013 110 795" and insert --102013110795.8,-- therefor Signed and Sealed this
Tenth Day of July, 2018

Andrei Iancu
*Director of the United States Patent and Trademark Office*